(12) United States Patent  
Berthezene et al.

(10) Patent No.: US 8,757,799 B2  
(45) Date of Patent: Jun. 24, 2014

(54) PROGRESSIVE MULTIFOCAL OPHTHALMIC LENS

(75) Inventors: Marie-Anne Berthezene, Charenton le Pont (FR); Bernard Bourdoncle, Charenton le Pont (FR); Laurent Calixte, Charenton le Pont (FR); Cyril Guilloux, Charenton le Pont (FR); Souazic Mousset, Charenton le Pont (FR); Damien Paille, Charenton le Pont (FR)

(73) Assignee: Essilor International, Paris (FR)

( * ) Notice: Subject to any disclaimer, the term of this patent is extended or adjusted under 35 U.S.C. 154(b) by 0 days.

(21) Appl. No.: 13/578,037

(22) PCT Filed: Feb. 8, 2011

(86) PCT No.: PCT/IB2011/050528  
§ 371 (c)(1),  
(2), (4) Date: Aug. 9, 2012

(87) PCT Pub. No.: WO2011/098951  
PCT Pub. Date: Aug. 18, 2011

(65) Prior Publication Data  
US 2013/0148078 A1 Jun. 13, 2013

(30) Foreign Application Priority Data  
Feb. 9, 2010 (FR) .................................... 10 50896

(51) Int. Cl.  
*G02C 7/06* (2006.01)

(52) U.S. Cl.  
CPC ......................................... *G02C 7/06* (2013.01)  
USPC .................................. 351/159.43; 351/159.06

(58) Field of Classification Search  
CPC ............. G02C 7/02; G02C 7/041; G02C 7/06; G02C 7/061  
USPC ............... 351/159.06, 159.17, 159.4, 159.42, 351/159.43, 159.45  
See application file for complete search history.

(56) References Cited

U.S. PATENT DOCUMENTS

2007/0121063 A1* 5/2007 Bourdoncle et al. ........... 351/169  
2011/0051081 A1* 3/2011 Del Nobile .................... 351/169

* cited by examiner

*Primary Examiner* — Darryl J Collins  
(74) *Attorney, Agent, or Firm* — Polsinelli PC

(57) ABSTRACT

Implementations described and claimed herein provide a complex surface of a progressive multifocal ophthalmic lens. In one implementation, the complex surface includes: a difference in ratio between cylinder value and surface addition less than 0.2 in absolute value; a first ratio between a maximum cylinder value for all points in a grouping circle and a surface addition; and a second ratio between a maximum cylinder value for all points on a disc and a surface addition. In another implementation, the complex surface includes: a difference in ratio between resultant astigmatism value and prescribed addition less than 0.3 in absolute value; a first ratio between a value of resultant astigmatism for all directions of gaze passing through an angular circle and a surface addition; and a second ration between a value of resultant astigmatism for all directions of gaze passing inside the angular circle and a prescribed addition.

12 Claims, 21 Drawing Sheets

PROGRESSIVE MULTIFOCAL OPHTHALMIC LENS

CROSS-REFERENCE TO RELATED APPLICATIONS

Figure 1:
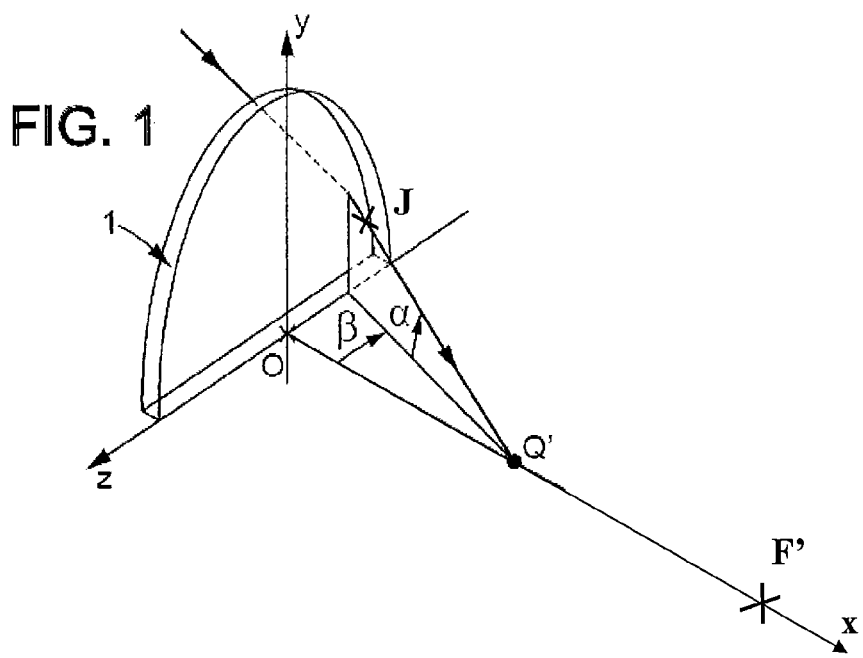

The present application is a national phase application under 35 U.S.C. 371 of PCT International Application No. PCT/IB2011/050528 filed on 8 Feb. 2011 and entitled Progressive Multifocal Ophthalmic Lens, which application claims priority to French Application No. 1050896 filed on 9 Feb. 2010. Both of the above-referenced applications are hereby incorporated by reference in their entirety for all that they disclose and teach.

The present invention relates to finished and semi-finished, progressive and multifocal, ophthalmic lenses having a complex surface comprising a far vision region, a near vision region, an intermediate vision region and a main meridian of progression passing through the three regions.

A spectacle wearer can be prescribed a positive or a negative power correction. For presbyopic wearers, the value of the power correction is different for far vision and for near vision, due to difficulty in accommodation for near vision. The prescription thus comprises a power value for far vision and a power addition representative of the power increment between far vision and near vision. The power addition is termed the prescribed addition. Ophthalmic lenses which compensate for presbyopia are multifocal lenses, the most suitable being progressive multifocal lenses.

Progressive multifocal ophthalmic lenses are now well known. Such lenses are used to compensate for presbyopia and allow the spectacle wearer to see objects over a wide range of distances, without having to remove his or her glasses. Progressive multifocal lenses typically have a far vision region, located in the top of the lens, a near vision region located in the bottom of the lens, an intermediate region connecting the near vision region and the far vision region, and a meridian passing through the three regions.

French patent application FR-A-2699294 discusses in its preamble the various elements of such a progressive multifocal ophthalmic lens as well as the work conducted by the applicant intended to improve the comfort of wearers of such lenses. Reference should be made to this document for details on these various points.

The applicant has also proposed, for example in the patent U.S. Pat. No. 5,270,745 or U.S. Pat. No. 5,272,495 to vary the meridian, notably the position of a near vision control point, depending on addition and ametropia.

The Applicant has also proposed various improvements to better meet the visual needs of presbyopic wearers and improve the comfort of progressive multifocal lenses, (U.S. Pat. No. 5,270,745, U.S. Pat. No. 5,488,442, FR-A-2704327).

Habitually, progressive multifocal lenses have an aspherical or complex surface, for example the surface opposite the wearer of the spectacles, and a spherical or toric surface, we call the prescription surface. The term aspherical surface should be taken to mean a surface that departs from the shape of a portion of a sphere. The spherical or toric surface makes it possible the lens to be adapted to the wearer's ametropia, so that a multifocal lens is generally only defined by its complex surface. The definition of the lens is limited in such a case to seeking an optimized surface for the complex surface.

As is well known, such a complex surface is usually defined by the altitude of every point thereon. Use is also made of parameters established by the minimum and maximum curvatures at each point, or more commonly their half-sum and difference. This half-sum and the absolute value of the difference multiplied by a factor n−1, n being the refractive index of the material of the lens, are called mean sphere, and cylinder.

Families of progressive multifocal lenses are defined, each lens of a family being characterized by an optical addition, which corresponds to the variation of power between the far vision region and the near vision region. More specifically, the optical addition, denoted $Add_{opt}$, corresponds to the power variation between a point L in the far vision region and a point P in the near vision region, which are respectively called the far vision reference point and near vision reference point, and which respectively represent the points of intersection of the gaze with the complex surface of the lens for vision at infinity and reading vision. For a lens surface, the surface addition $Add_{SURF}$ can be expressed as the variation in mean sphere between the point L in the far vision region and the point P in the near vision region. The optical or surface addition then generally corresponds to the addition prescribed in the most common case where the lens comprises a complex surface and a spherical or toric surface.

Within the same family of lenses, addition varies from one lens to the other in the family between a minimum value of addition and a maximum addition value. Usually, the minimum and maximum values for addition are respectively 0.75 diopter and 3.5 diopters, and addition varies in 0.25 diopter steps from one lens to the other of the family.

In a family of lenses, lenses with the same addition may differ usually in terms of ametropia, at a reference point by the value of mean sphere, measured on the face opposite the eye. One can for example choose to measure the base at reference point L for far vision.

For progressive multifocal lenses, by the choice of a pair (addition, base) we define a whole set of complex multifocal faces. Usually, we can define five values for the base and 12 values of addition giving sixty complex faces. For each pair (addition, base), a lens commonly called "semi-finished" the addition of which is provided by the complex surface by the change in curvature between the far vision region and the near vision region may be obtained. Such a lens has enough material to allow the manufacturer to machine the face opposite to the complex surface making it possible to obtain the desired lens prescription.

The ophthalmic prescription may include in addition to the power prescription a prescription for astigmatism. Such a prescription is made up of an axis value (in degrees) and an amplitude value (in diopters). The amplitude value represents the difference between the maximum and minimum power in a given direction for correcting the defect in eyesight of a wearer. According to the chosen convention, the axis represents the orientation of one of two powers with respect to a reference axis and in a direction of rotation defined by convention. In practice, the TABO convention is used. In this convention, the reference axis is horizontal and the direction of rotation is the clockwise direction for each eye, when looking at the wearer. A value of +45° for axis consequently represents an axis oriented obliquely, which, when looking at the wearer, extends from the quadrant situated at the upper right to the quadrant located at the lower left. Such a prescription of astigmatism is measured on the wearer when viewing in far vision. Astigmatism is the term used for the pair (magnitude, angle); although this is a misnomer, astigmatism is also sometimes used to designate the magnitude of astigmatism. The context enables the skilled person to understand which meaning is intended. It is also known to the skilled person that the prescription in power and astigmatism of a wearer are usually designated and denoted using the terms of sphere, cylinder and axis. Ophthalmic lenses correcting an astigmatism prescription of a wearer may consist of spherocylindrical surfaces.

Moreover, the laws of optics governing the path of rays result in the appearance of optical defects when the light rays move away from the central axis of any lens. These known defects which include among others a power defect and an astigmatism defect can be generically called obliquity defects of light rays. One skilled in the art can compensate for these defects as shown in EP-A-0990939, U.S. Pat. No. 5,270,746 (EP-A-0461624) and WO-A-98 12590.

Multifocal ophthalmic lenses, regardless of the type to which they belong, inevitably present optical aberrations (resultant astigmatism, defects in power, prismatic deviations . . . ) that involve a relatively long period of adaptation and affect the comfort of vision, as regards both static and dynamic vision. By the term dynamic vision we mean the vision of objects moving in the field of view, resulting from motion or as a result of the lens wearer moving. Additionally, it would be useful to reduce peripheral vision defects. Existing progressive lenses do indeed allow overall satisfactory vision when the wearer is looking at an object which is straight ahead of him or her, at any distance whatsoever. They do, on the other hand, exhibit notable aberrations in peripheral vision.

There is a need for a progressive multifocal lens to overcome the drawbacks mentioned above and more particularly to improve wearer comfort.

To this end, the invention provides a progressive multifocal ophthalmic lens comprising a complex surface having at every point thereon a value of mean sphere and a cylinder value, the surface comprising:
- a far vision region having a reference point for far vision;
- a near vision region having a reference point for near vision;
  - a surface addition defined as a difference in mean sphere between the reference point for near vision and the reference point for far vision;
  - an intermediate vision region between the far vision region and the near vision region;
- a main meridian of progression passing through the three regions and dividing the surface into a temporal region and a nasal region, a portion on the meridian passing through the far vision region defining a vertical axis;
- a fitting cross;
  - a prism reference point in the center of a segment connecting micro-engravings, the prism reference point defining, with the vertical axis of the meridian and the horizontal axis connecting the micro-engravings, a reference frame, the reference frame making it possible to define each of the points on the lens by a value on the y-axis relative to the vertical axis and a value on the x-axis relative to the horizontal axis, the prism reference point having a value of zero on the x-axis and on the y-axis;
- a circle grouping together all points on the lens having the same value on the x-axis and the same value on the y-axis as points situated within a circle in the plane of said reference frame of 35 mm diameter and centered on a point located 8.5 mm below the fitting cross and offset horizontally to the nasal side by 1.25 mm,
- a disc grouping together all points on the lens having the same value on the x-axis and the same value on the y-axis as points situated within said circle,
  - a progression length less than 14.5 mm, progression length being defined as a difference between the value on the y-axis of the fitting cross and the value on the y-axis of the point on the meridian where variation in mean sphere with respect the value of mean sphere at the reference point for far vision reaches 85% of surface addition;
- a difference in ratio between cylinder value and surface addition less than 0.2 in absolute value for every pair of points on the lens symmetrical with respect to the fitting cross and having the same y-axis value as the fitting cross, and an x-axis value less than 20 millimeters in absolute value;
- a first ratio between:
  - maximum cylinder value for all of the points in the circle and
  - surface addition
  less than 0.7; and
- a second ratio between:
  - maximum cylinder value for all the points on the disc and
  - surface addition
  less than or equal to 1.05.

Depending on the particular embodiment, the lens can include one or more of the following characteristics:
- the first ratio is less than 0.65.
- the second ratio is less than or equal to 0.75,
- progression length is less than 13.5 mm.
- a difference in ratio between cylinder value and surface addition is less than 0.1 in absolute value for every pair of points on the lens which are symmetrical with respect to the fitting cross and having the same y-axis value as a fitting cross and an x-axis value less than 20 mm in absolute value.
- the lens is a finished or semi-finished lens.

Also provided is a progressive multifocal ophthalmic lens comprising a complex surface having at every point thereon a value of mean sphere and a cylinder value, the surface comprising:
- a far vision region having a reference point for far vision;
- a near vision region having a reference point for near vision;
  - a surface addition defined as a difference in mean sphere between the reference point for near vision and the reference point for far vision;
  - an intermediate vision region between the far vision region and the near vision region;
- a main meridian of progression passing through the three regions, a portion on the meridian passing through the far vision region defining a vertical axis;
- a fitting cross;
  - a prism reference point in the center of a segment connecting micro-engravings, the prism reference point defining, with the vertical axis of the meridian and the horizontal axis connecting the micro-engravings, a reference frame, the reference frame making it possible to define each of the points on the lens by a value on the y-axis relative to the vertical axis and a value on the x-axis relative to the horizontal axis, the prism reference point having a value of zero on the x-axis and on the y-axis;
- a disc grouping together all points on the lens having the same value on the x-axis and the same value on the y-axis as points situated within a circle in the plane of said reference frame of 60 mm diameter and centered on the prism reference point;
- a progression length less than 14.5 mm, progression length being defined as a difference between the value on the y-axis of the fitting cross and the value on the y-axis of the point on the meridian where variation in mean sphere with respect the value of mean sphere at the reference point for far vision reaches 85% of surface addition;

a difference in ratio between cylinder value and surface addition less than 0.2 in absolute value for every pair of points on the lens symmetrical with respect to the fitting cross and having the same y-axis value as the fitting cross, and an x-axis value less than 20 millimeters in absolute value;

a first ratio between:
  cylinder value and
  surface addition
less than 0.7, for every point on the lens having a y-axis value of −20 mm and an x-axis value less than 20 mm in absolute value; and a second ratio between:
  cylinder value and
  surface addition
less than or equal to 1.05, for every point on the disc.

Depending on the particular embodiment, the lens can include one or more of the following characteristics:
  the first ratio is less than 0.65.
  the second ratio is less than or equal to 0.75,
  progression length is less than 13.5 mm,
  a difference in ratio between cylinder value and surface addition is less than 0.1 in absolute value for every pair of points on the lens which are symmetrical with respect to the fitting cross and having the same y-axis value as a fitting cross and an x-axis value less than 20 mm in absolute value.
  the lens is a finished or semi-finished lens.

There is also provided a progressive multifocal ophthalmic lens comprising a complex surface having at every point thereon a value of mean sphere and a cylinder value, the surface comprising:
  a far vision region having a reference point for far vision;
  a near vision region having a reference point for near vision;
    a surface addition defined as a difference in mean sphere between the reference point for near vision and the reference point for far vision;
    an intermediate vision region between the far vision region and the near vision region;
  a main meridian of progression passing through the three regions and dividing the surface into a temporal region and a nasal region, a portion on the meridian passing through the far vision region defining a vertical axis;
  a fitting cross;
    a prism reference point in the center of a segment connecting micro-engravings, the prism reference point defining, with the vertical axis of the meridian and the horizontal axis connecting the micro-engravings, a reference frame, the reference frame making it possible to define each of the points on the lens by a value on the y-axis relative to the vertical axis and a value on the x-axis relative to the horizontal axis, the prism reference point having a value of zero on the x-axis and on the y-axis;
  a disc grouping together all points on the lens having the same value on the x-axis and the same value on the y-axis as points situated within a circle in the plane of said reference frame of 60 mm diameter and centered on the prism reference point;
  a progression length less than 14.5 mm, progression length being defined as a difference between the value on the y-axis of the fitting cross and the value on the y-axis of the point on the meridian where variation in mean sphere with respect the value of mean sphere at the reference point for far vision reaches 85% of surface addition;

a difference in ratio between cylinder value and surface addition less than 0.2 in absolute value for every pair of points on the lens symmetrical with respect to the fitting cross and having the same y-axis value as the fitting cross, and an x-axis value less than 20 millimeters in absolute value;

a first ratio between:
  cylinder value and
  surface addition
less than 0.72, for every point on the lens in the temporal region having an x-axis value of 20 mm in absolute value and of which the y-axis value is less than 20 mm in absolute value, and/or a second ratio between:
  cylinder value and
  surface addition
less than 0.72, for every point on the lens within the nasal region having an x-axis value of 22 mm in absolute value and of which the y-axis value is less than 20 mm in absolute value; and a third ratio between
  cylinder value and
  surface addition
less than or equal to 0.95, for every point on the disc.

Depending on the particular embodiment, the lens can further include one or more of the following characteristics:
  the first ratio is less than 0.51, and/or the second ratio is less than 0.55.
  the third ratio is less than or equal to 0.75.
  progression length is less than 13.5 mm.
  a difference in ratio between cylinder value and surface addition is less than 0.1 in absolute value for every pair of points on the lens which are symmetrical with respect to the fitting cross and having the same y-axis value as a fitting cross and an to x-axis value less than 20 mm in absolute value.
  the lens is a finished or semi-finished lens.

Also provided is a progressive multifocal ophthalmic lens for a wearer for whom an addition has been prescribed, the lens having:
  for each direction of gaze, a power and a resultant astigmatism for standard wearing conditions, each direction of gaze corresponding to an angle of lowering of gaze and an azimuth angle;
  the lens comprising:
  a far vision region having a reference point for far vision corresponding to a reference direction of gaze for far vision;
  a near vision region having a reference point for near vision corresponding to a reference direction of gaze for near vision;
  an intermediate vision region between the far vision region and the near vision region;
  a main meridian of progression passing through the three regions and dividing the lens into a temporal region and a nasal region;
  a fitting cross corresponding to a primary direction of gaze having an angle of lowering of gaze equal to zero and an azimuth angle of zero;
  a progression length less than 29°, progression length being defined as a difference in angle between the primary direction of gaze and an angle of lowering of gaze passing through the meridian for which wearer optical power variation with respect to wearer optical power value at the reference point for far vision reaches 85% of the prescribed addition;

a difference in ratio between resultant astigmatism value and prescribed addition less than 0.3 in absolute value and for every pair of directions of gaze that are symmetrical with respect to a primary direction of gaze, and having zero angle of lowering of gaze and an azimuth angle less than 52° in absolute value;

a first ratio between:
　a value of resultant astigmatism for all the directions of gaze passing through an angular circle of diameter 70° centered on a direction of gaze having an angle of lowering of gaze of 17° below the fitting cross and having an azimuth angle of 2.5° in absolute value at the nasal side, and
surface addition
less than 0.88; and a second ratio between:
　the value of resultant astigmatism for all the directions of gaze passing inside said circle, and
　prescribed addition
less than or equal to 1.

Depending on the embodiment, the lens can further include one or more of the following characteristics:
　the first ratio is less than 0.8.
　the second ratio is less than or equal to 0.9.
　a difference in ratio between value of resultant astigmatism and prescribed addition is less than 0.08 in absolute value for every pair of directions of gaze that are symmetrical with respect to the primary direction of gaze and having zero angle of lowering of gaze and an azimuth angle less than 52° in absolute value.
　progression length is less than 27°.

Also provided is a progressive multifocal ophthalmic lens for a wearer for whom an addition has been prescribed, the lens having:
　for each direction of gaze, a power and a resultant astigmatism for standard wearing conditions, each direction of gaze corresponding to an angle of lowering of gaze and an azimuth angle;
　the lens comprising:
　a far vision region having a reference point for far vision corresponding to a reference direction of gaze for far vision;
　a near vision region having a reference point for near vision corresponding to a reference direction of gaze for near vision;
　an intermediate vision region between the far vision region and the near vision region;
　a main meridian of progression passing through the three regions and dividing the lens into a temporal region and a nasal region;
　a fitting cross corresponding to a primary direction of gaze having an angle of lowering of gaze equal to zero and an azimuth angle of zero;
　a prism reference point;
　a progression length less than 29°, progression length being defined as a difference in angle between the primary direction of gaze and an angle of lowering of gaze passing through the meridian for which wearer optical power variation with respect to wearer optical power value at the reference point for far vision reaches 85% of the prescribed addition;
　a difference in ratio between resultant astigmatism value and prescribed addition less than 0.3 in absolute value and for every pair of directions of gaze that are symmetrical with respect to a primary direction of gaze, and having zero angle of lowering of gaze and an azimuth angle less than 52° in absolute value;
　a first ratio between:
　　value of resultant astigmatism and
　　prescribed addition
　less than 0.75, for all the directions of gaze having an angle of lowering of gaze of 44° below the fitting cross and an azimuth angle less than 26° in absolute value; and
　a second ratio between
　　value of resultant astigmatism and
　　prescribed addition
　less than or equal to 1.1, for every direction of gaze passing inside an angular disc of 100° diameter centered on the primary direction of gaze.

Depending on the embodiment, the lens can additionally include one or more of the following characteristics:
　the first ratio is less than 0.6.
　the second ratio is less than or equal to 0.9
　a difference in ratio between value of resultant astigmatism and prescribed addition is less than 0.08 in absolute value for every pair of directions of gaze that are symmetrical with respect to the primary direction of gaze and having zero angle of lowering of gaze and an azimuth angle less than 52° in absolute value.
　progression length is less than 27°.

A progressive multifocal ophthalmic lens for a wearer for whom an addition has been prescribed, the lens having:
　for each direction of gaze, a power and a resultant astigmatism for standard wearing conditions, each direction of gaze corresponding to an angle of lowering of gaze and an azimuth angle;
　the lens comprising:
　a far vision region having a reference point for far vision corresponding to a reference direction of gaze for far vision;
　a near vision region having a reference point for near vision corresponding to a reference direction of gaze for near vision;
　an intermediate vision region between the far vision region and the near vision region;
　a main meridian of progression passing through the three regions and dividing the lens into a temporal region and a nasal region;
　a fitting cross corresponding to a primary direction of gaze having an angle of lowering of gaze equal to zero and an azimuth angle of zero;
　a prism reference point;
　a progression length less than 29°, progression length being defined as a difference in angle between the primary direction of gaze and an angle of lowering of gaze passing through the meridian for which wearer optical power variation with respect to wearer optical power value at the reference point for far vision reaches 85% of the prescribed addition;
　a difference in ratio between resultant astigmatism value and prescribed addition less than 0.3 in absolute value and for every pair of directions of gaze that are symmetrical with respect to a primary direction of gaze, and having zero angle of lowering of gaze and an azimuth angle less than 52° in absolute value;
　a first ratio between:
　　value of resultant astigmatism and
　　prescribed addition less than 0.9, for all the directions of gaze passing through the temporal region and having an azimuth angle of 40° in absolute value and an angle of lowering of gaze less than 32° in absolute value, and/or a second ratio between
value of resultant astigmatism and
prescribed addition
less than 0.85, for every direction of gaze passing through the nasal region and having an azimuth angle of 38° in absolute value and an angle of lowering of gaze less than 32° in absolute value; and a third ratio between
value of resultant astigmatism and
prescribed addition
less than or equal to 1.2, for every direction of gaze passing through an angular disc of 100° diameter centered on the primary direction of gaze.

Depending on the embodiment, the lens can additionally include one or more of the following characteristics:

the first ratio is less than 0.65 and/or the second ratio is less than 0.8.

the third ratio is less than or equal to 0.85.

a difference in ratio between value of resultant astigmatism and prescribed addition is less than 0.08 in absolute value for every pair of directions of gaze that are symmetrical with respect to the primary direction of gaze and having zero angle of lowering of gaze and an azimuth angle less than 52° in absolute value.

progression length is less than 27°.

The invention also provides an item of visual equipment including a lens according to one of the embodiments described above.

Figure 2:
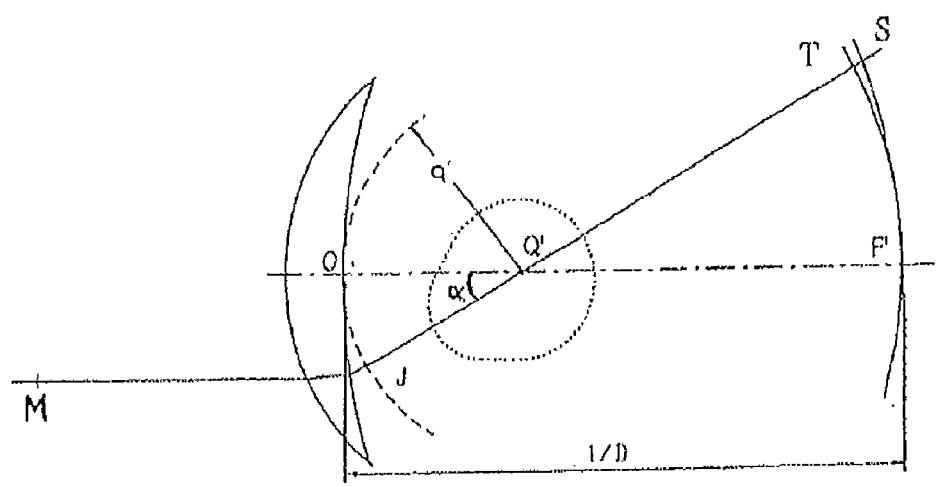
Figure 3:
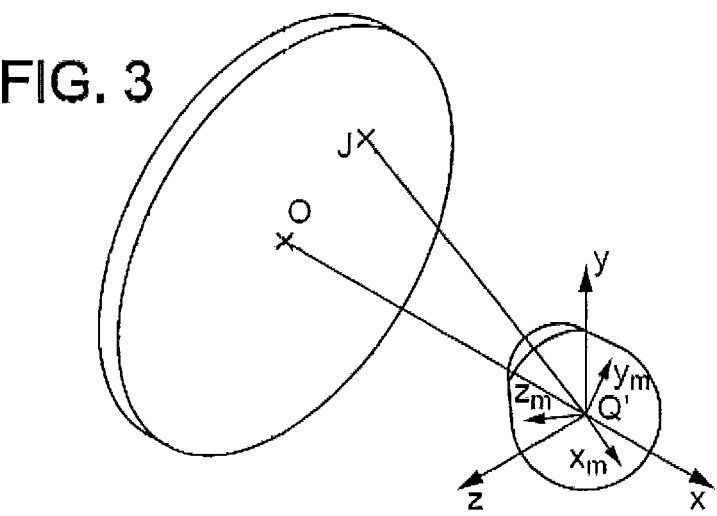
Figure 4:
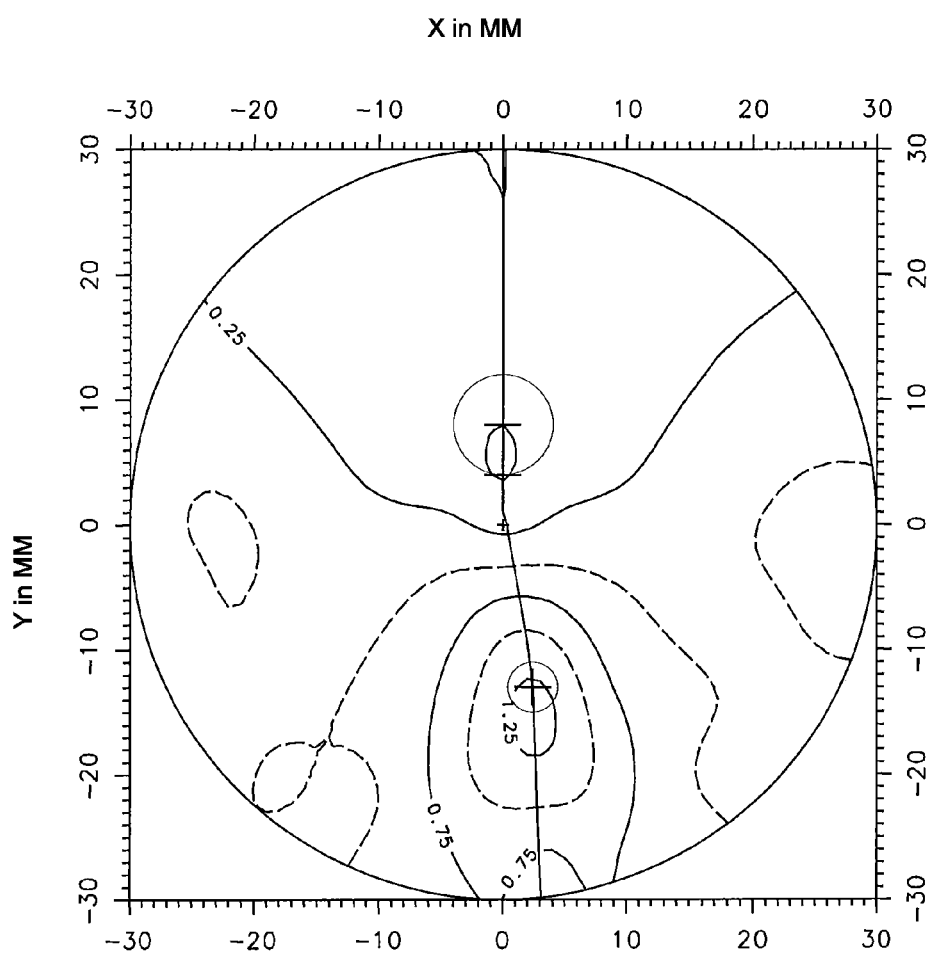
Figure 5:
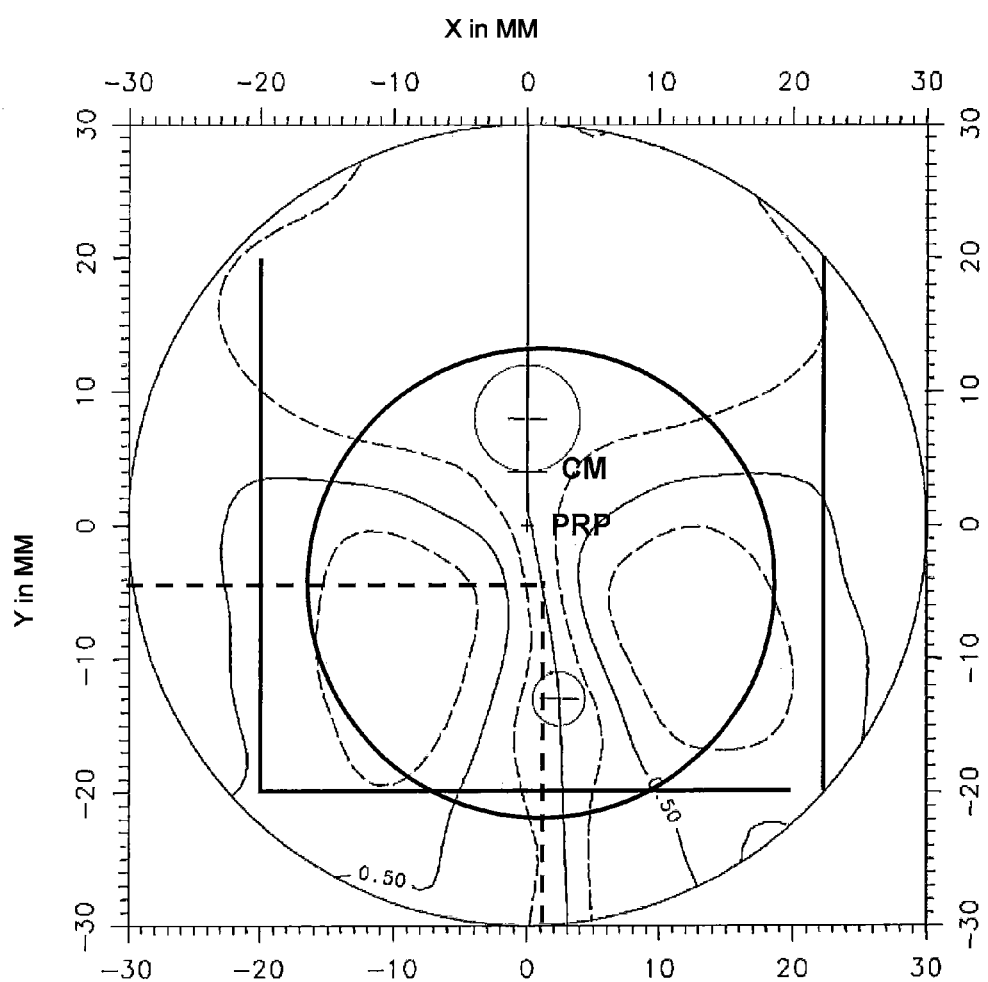
Figure 6:
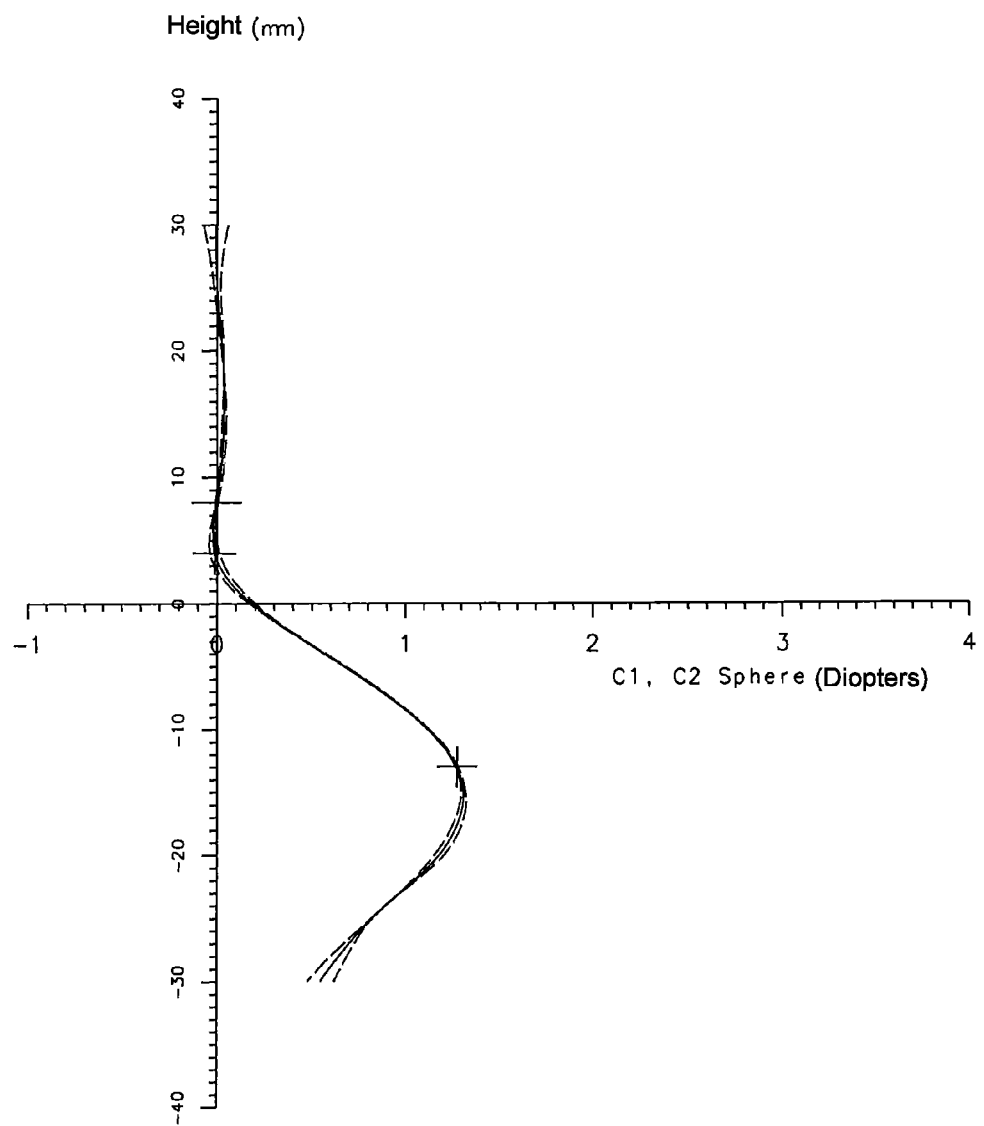
Figure 7:
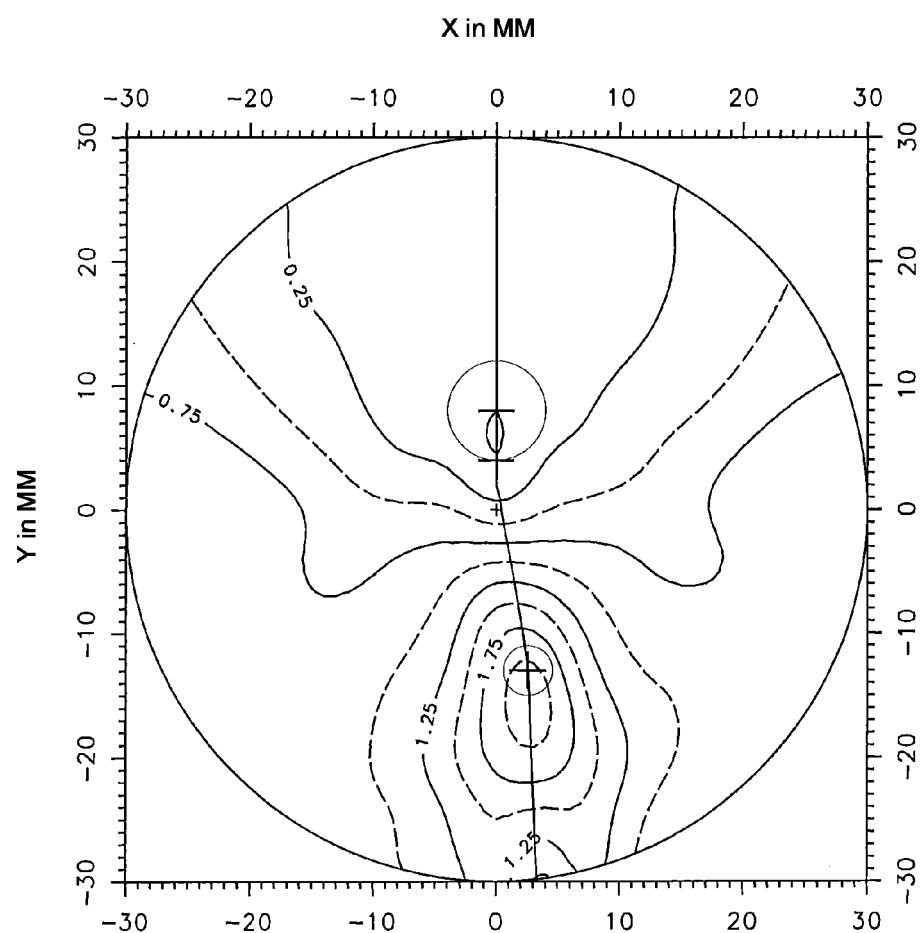
Figure 8:
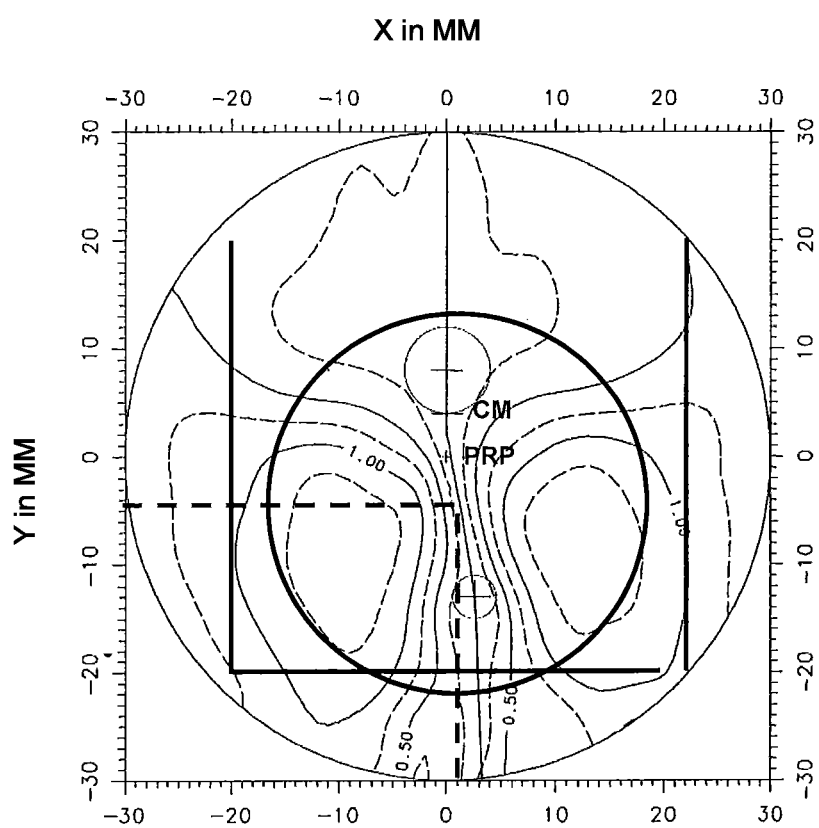
Figure 9:
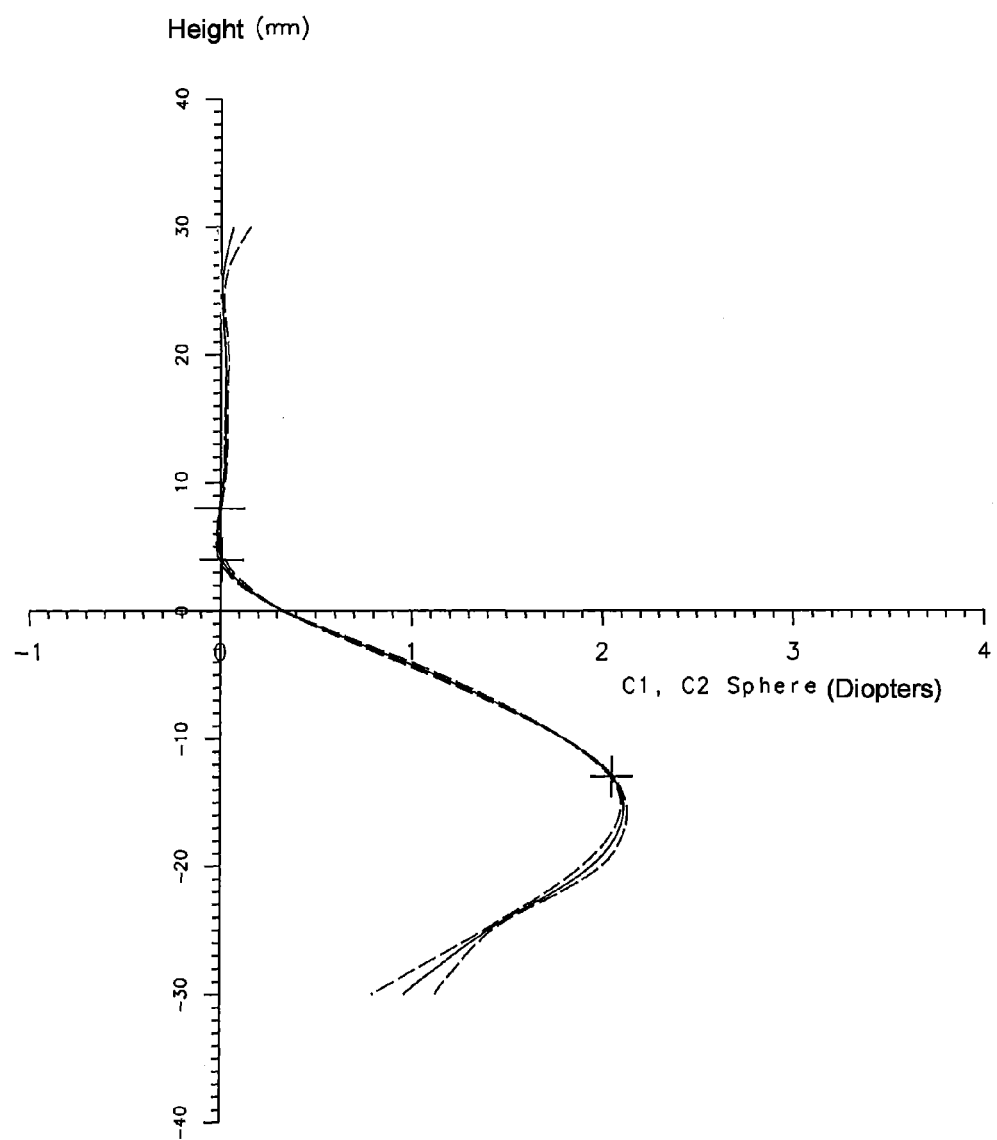
Figure 10:
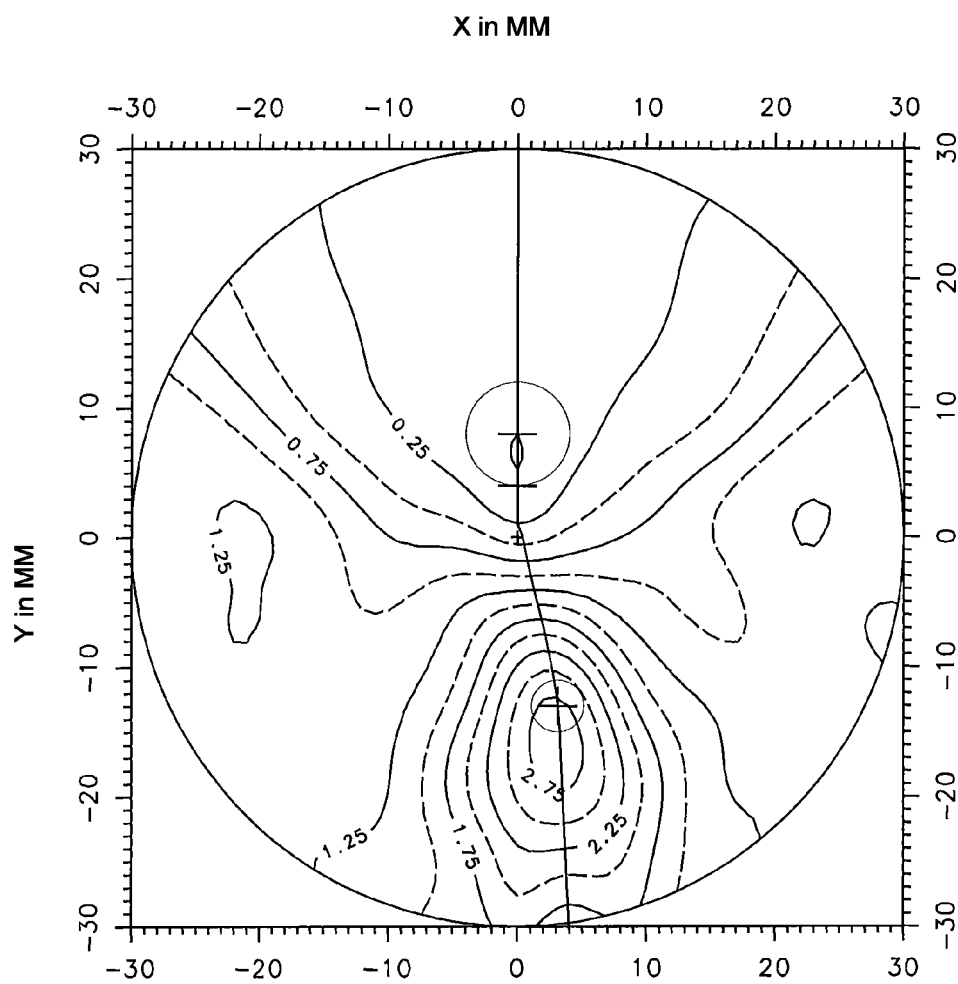
Figure 11:
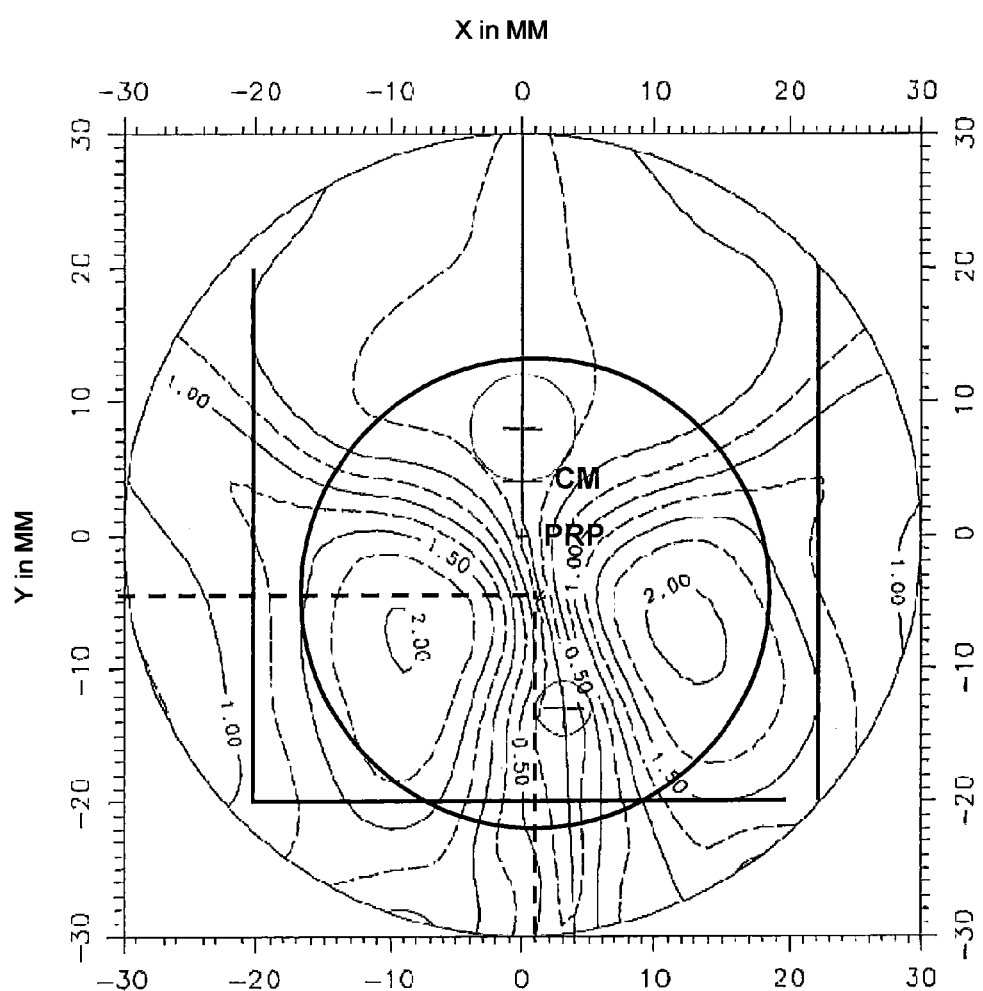
Figure 12:
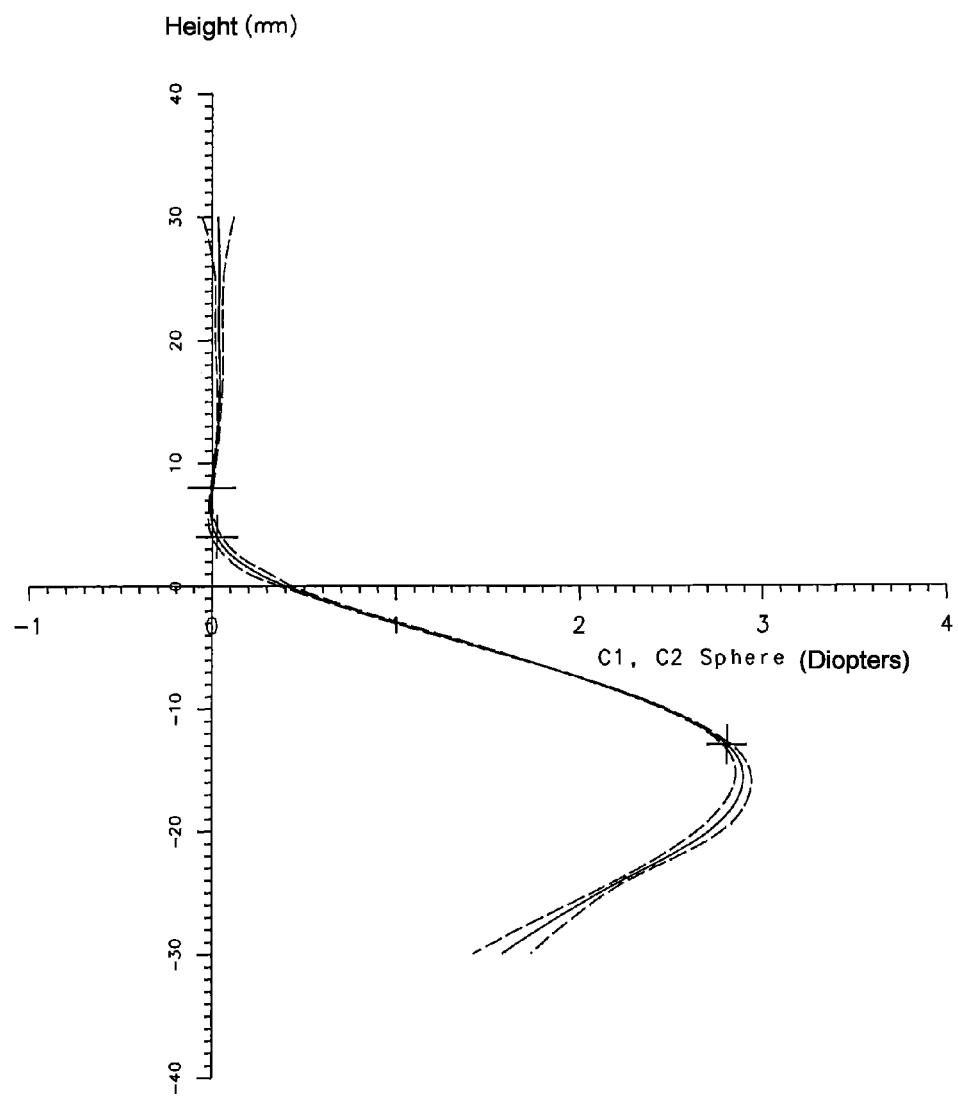
Figure 13:
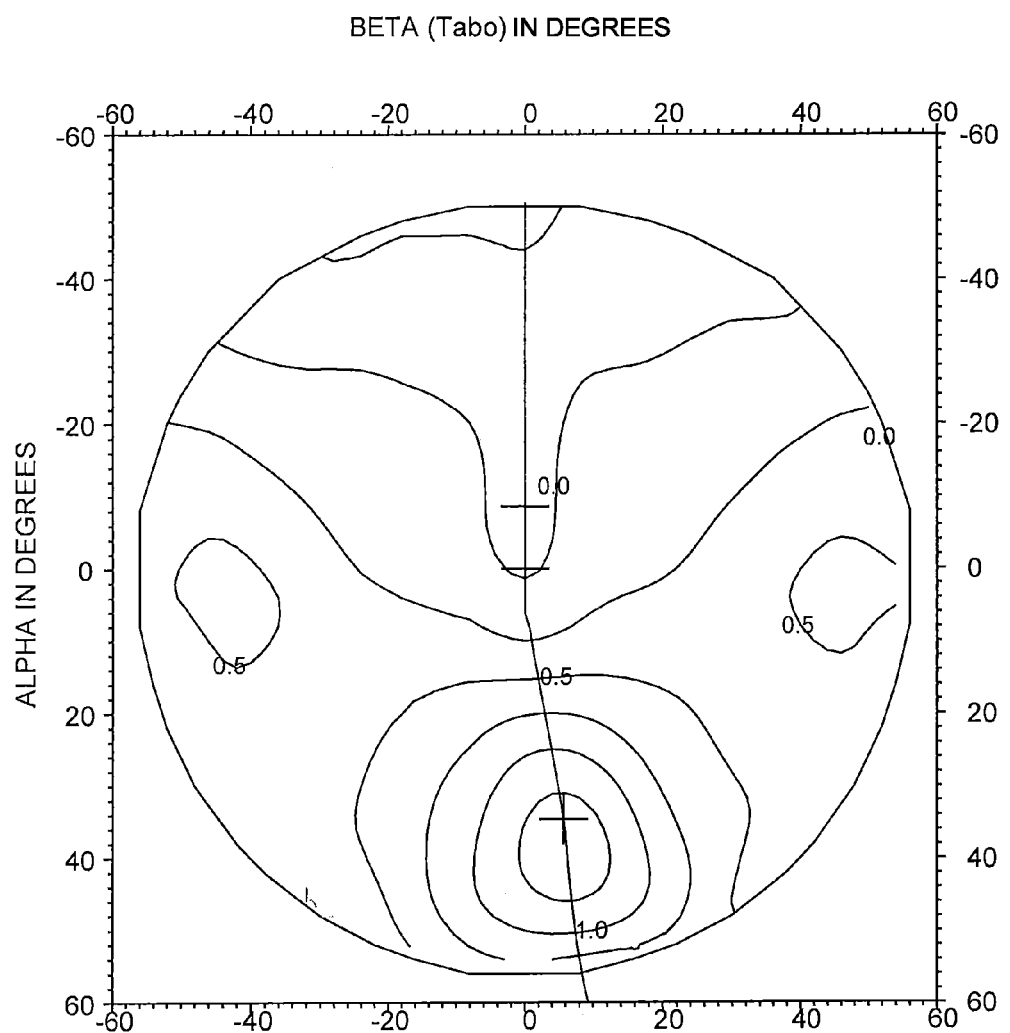
Figure 14:
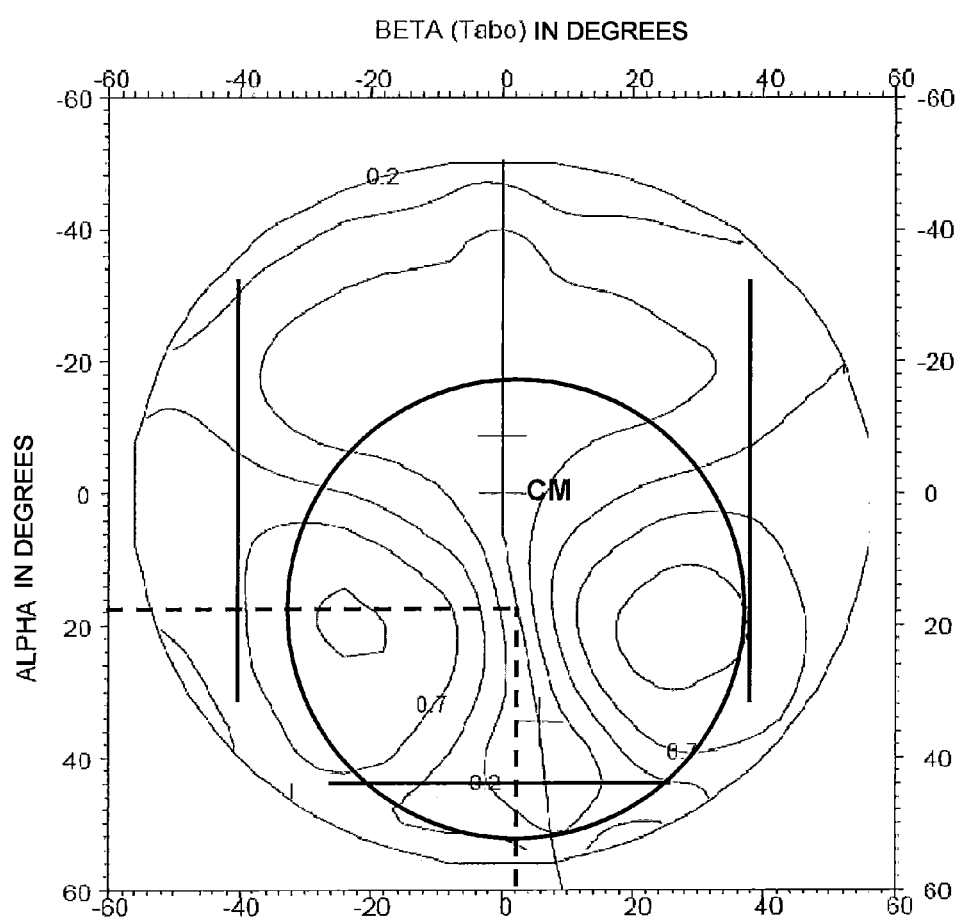
Figure 15:
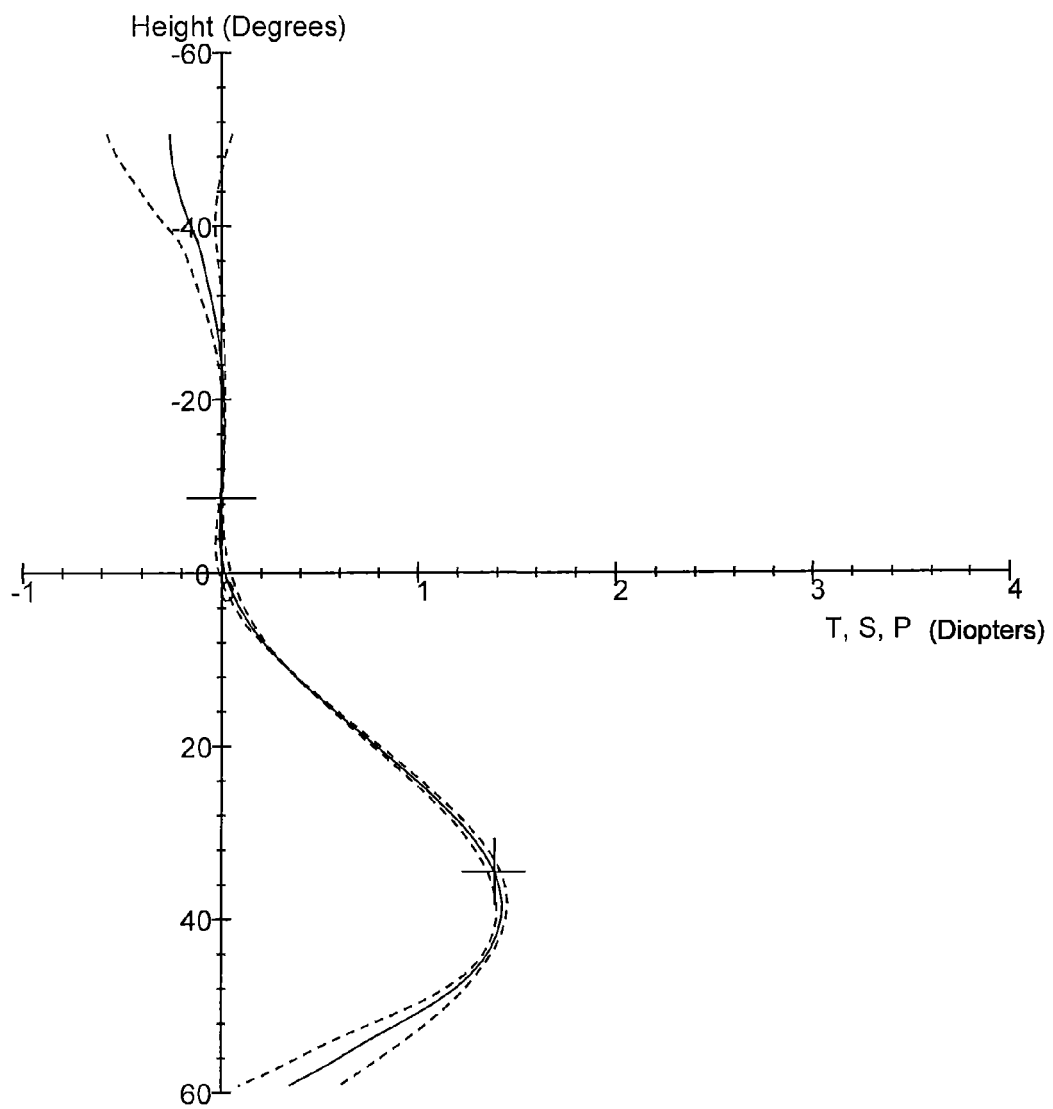
Figure 16:
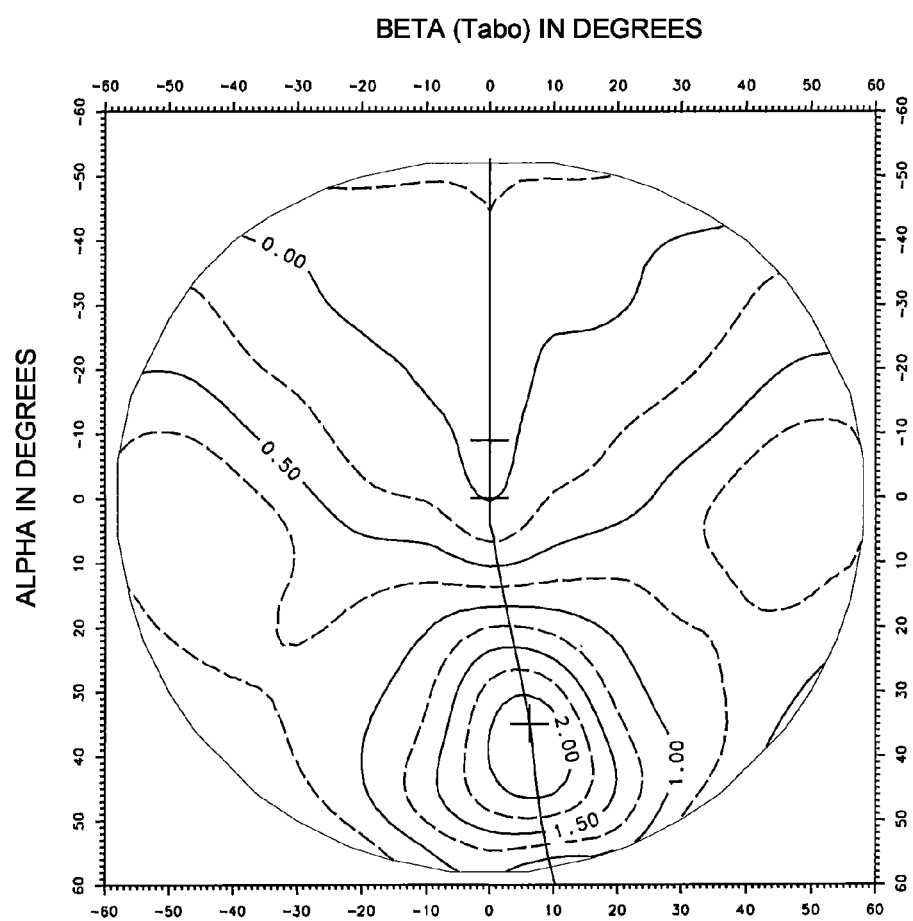
Figure 17:
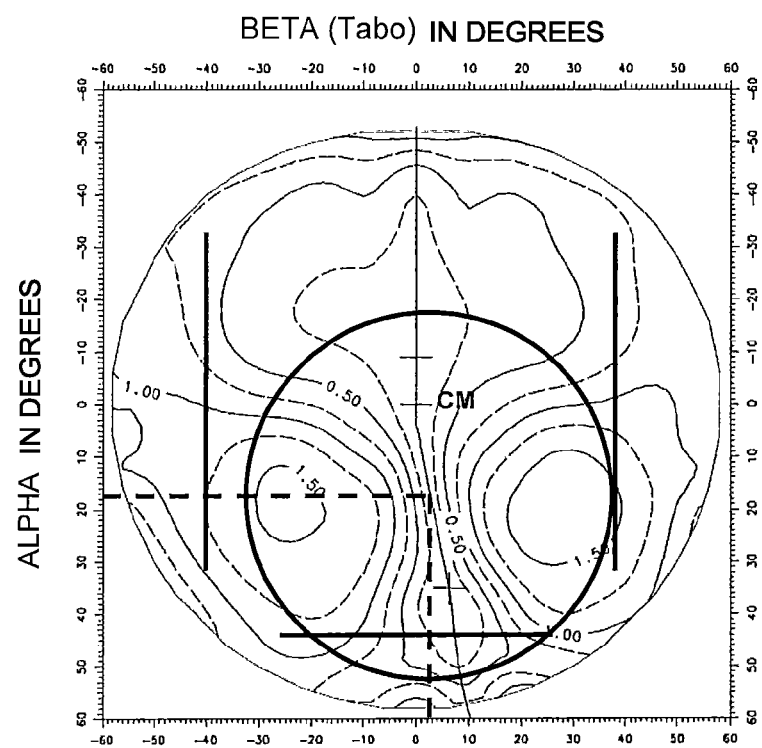
Figure 18:
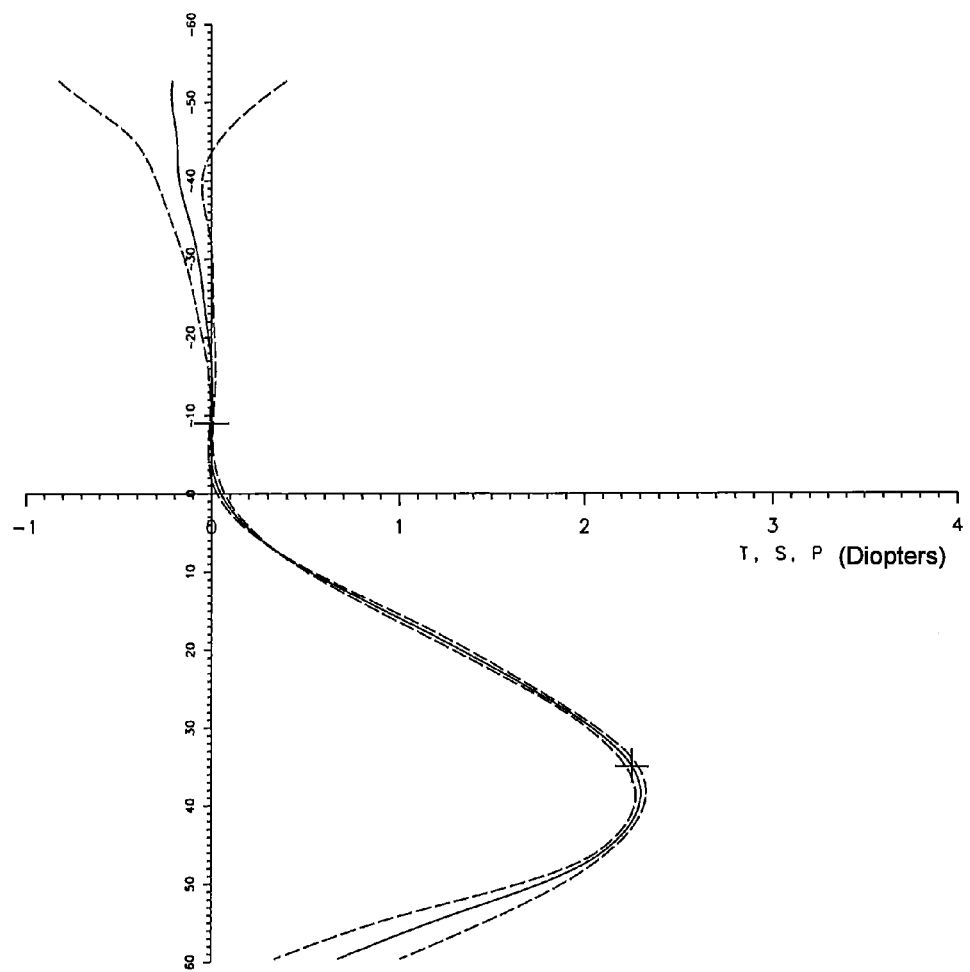
Figure 19:
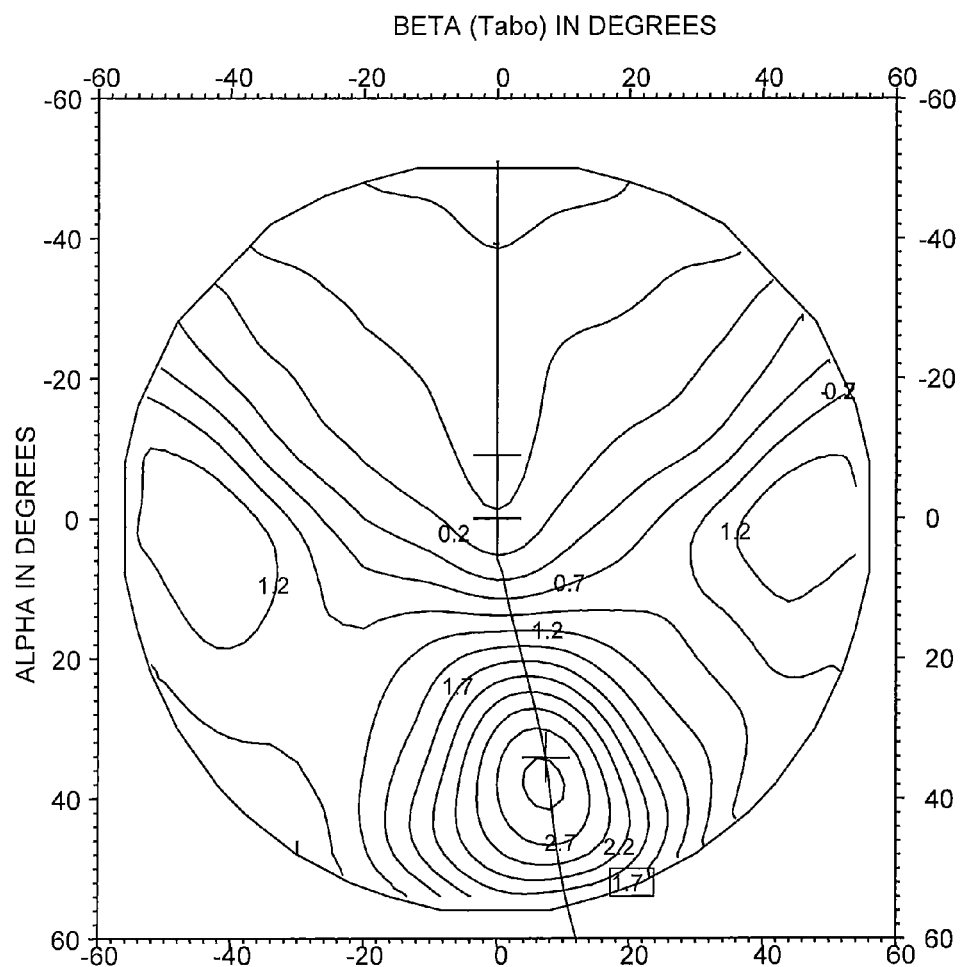
Figure 20:
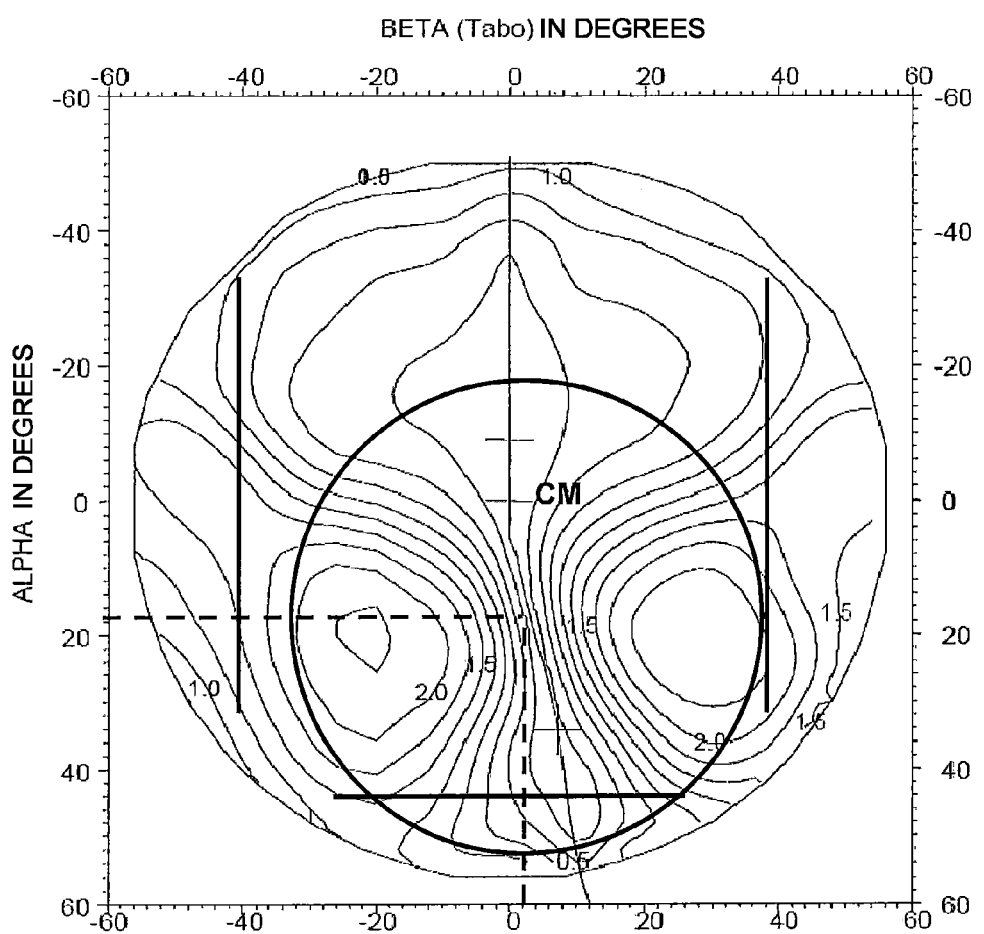
Figure 21:
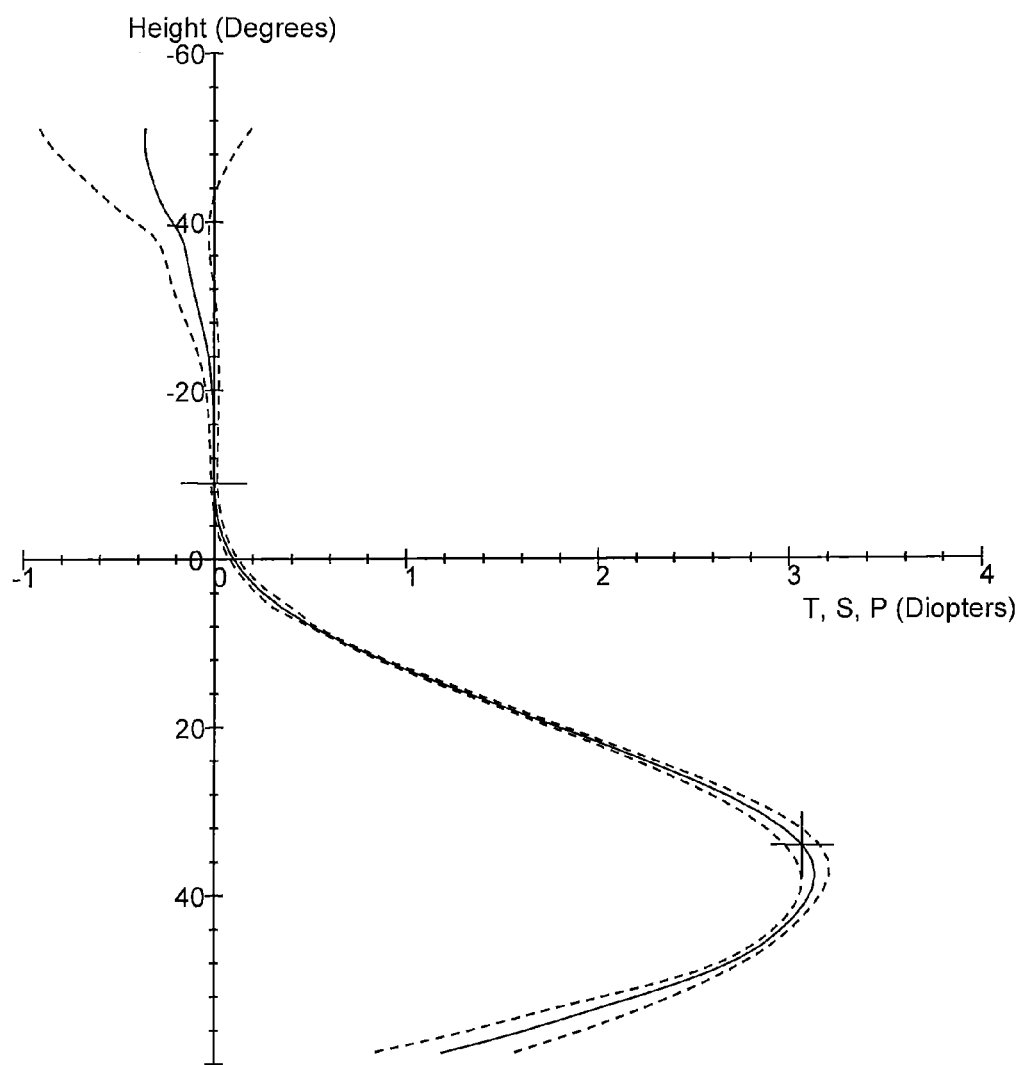

Other features and advantages of the invention will become apparent on reading the following detailed description of embodiments of the invention given by way of example only and with reference to the drawings which show in:

FIGS. 1 to 3, diagrammatic representations of an optical lens and eye system;

FIGS. 4 to 6, characterizations in surface terms of an exemplary lens;

FIGS. 7 to 9, characterizations in surface terms of an exemplary lens;

FIGS. 10 to 12, characterizations in surface terms of an exemplary lens;

FIGS. 13 to 15, characterizations in optical terms of an exemplary lens;

FIGS. 16 to 18, characterizations in optical terms of an exemplary lens;

FIGS. 19 to 21, characterizations in optical terms of an exemplary lens.

There is provided a progressive multifocal lens having particular characteristics. Such a lens makes it possible to obtain improved peripheral vision. This results in improved comfort for the wearer.

It is proposed to define the characteristics of lenses in terms of mean sphere and cylinder. Thus, as known per se, at any point on an aspherical surface, a mean sphere SPH can be defined by the following formula:

$$SPH = \frac{n-1}{2}\left(\frac{1}{R_1} + \frac{1}{R_2}\right)$$

wherein R1 and R2 are the maximum and minimum radii of curvature expressed in meters, and n is the refractive index of the material constituting the lens.

Cylinder CYL can also be defined by the formula:

$$CYL = \frac{n-1}{2}\left|\frac{1}{R_1} - \frac{1}{R_2}\right|$$

The characteristics of the complex face of the lens can be expressed using the mean sphere and cylinder.

Moreover, a progressive multifocal lens can also be defined by optical characteristics taking into account the situation of the wearer of the lenses.

In the remainder of the description, reference is made to terms such as "top", "bottom", "horizontal", "vertical", "above", "below" or other words indicating relative positions. It will be understood that these terms should be understood under the wearing conditions of the lens and they are to take reference with respect to the prism reference point $P_{PRP}$ when dealing with a surface or with respect to the fitting cross in the case of the lens. The prism reference point $P_{PRP}$ and the fitting cross are defined below.

FIGS. 1-2 show diagrams of eye and lens optical systems, to illustrate the definitions used in the description. Specifically, FIG. 1 is a diagram showing a perspective view of such a system illustrating the parameters a and p used to define a direction of gaze. FIG. 2 is a view in a vertical plane parallel to the antero-posterior direction of the wearer's head and passing through the center of rotation of the eye in a case where the parameter β is 0.

Q' is called the center of rotation of the eye; axis Q'F', shown in FIG. 2 in phantom, is the horizontal axis through the center of rotation of the eye and extending in front of the wearer—in other words the axis Q'F' corresponds to the primary direction of gaze. This axis intersects the complex surface of the lens at a point called the fitting cross, which is marked on the lenses to allow positioning of the lenses by an optician. We define the point O, the point of intersection of the rear surface of the lens and the axis Q'F'. We define a sphere of vertices, center Q', and a radius q', which is tangent to the back surface of the lens at a point on the horizontal axis. For example, a radius value q' of 25.5 mm corresponds to a commonly occurring value and provides satisfactory results when the lenses are worn.

A given direction of gaze—shown in solid lines in FIG. 3—corresponds to a position of the eye in rotation about Q' and a point J on the sphere of vertices, the angle β is the angle between the axis Q'F' and the projection of the straight line Q'J on the horizontal plane containing the axis Q'F'; this angle appears in the diagram of FIG. 1. The angle α is the angle formed between the axis Q'J and the projection of the straight line Q'J on the horizontal plane containing the axis Q'F; this angle appears in the diagrams of FIGS. 1 and 2. A given direction of gaze consequently corresponds to a point J on the sphere of vertices or to a pair (α, β). The more the value of the angle of gaze lowering α is positive, the greater is the lowering of gaze and the more negative this value is, the more the gaze is raised.

The image of a point in the object space in a direction of gaze, and at a given object distance, is formed between two points S and T corresponding to minimum and maximum focal lengths, which are tangential and sagittal focal lengths in the case of surfaces of revolution. On the optical axis, the image of a point in the object space at infinity is formed at F'. Distance D is the focal length of the eye-lens system.

We use the term ergorama to describe a function associating with each direction of gaze the usual distance of the object point. Typically, for far vision in the primary direction of gaze, the object point is at infinity. In near vision, in a direction substantially corresponding to an angle α of the order of 35° and at an angle β in absolute value of the order of 5° to the nasal side, the object distance is of the order of 30 to 50 cm. For more details on a possible definition of an ergorama, reference can be made to FR-A-2753805 (U.S. Pat. No. 6,318,859). This document describes an ergorama, its definition and modeling process. One particular ergorama involves only taking points at infinity. For the method of the invention, one can consider the points at infinity or not. The ergorama may also be dependent on the wearer's ametropia.

Using these elements, we can define a power and an astigmatism, in each direction of gaze. For a direction of gaze (α, β), we consider an object point M at a given object distance given by the ergorama. In the object space, we define, for the point M on the corresponding light ray, an object proximity ProxO as the inverse of the distance between point M and point J on the sphere of vertices:

$$\mathrm{Prox}O = 1/MJ$$

This makes it possible calculation of the object proximity in the context of a thin lens approximation at any point on the sphere of vertices, which is used for the determination of the ergorama. For an actual lens, it is possible by using a ray tracing program to consider the object proximity as the inverse of the distance between the object point and the front surface of the lens, on the corresponding ray.

Still for the same direction of gaze (α, β), the image of a point M having a given object proximity is formed between two points S and T corresponding respectively to minimum and maximum focal lengths (which would be sagittal and tangential focal lengths in the case of surfaces of revolution). We shall call image proximity of the point M, the amount ProxI:

$$\mathrm{Prox}I = \frac{1}{2}\left(\frac{1}{JT} + \frac{1}{JS}\right)$$

By analogy with the case of the thin lens, this defines, in a given direction of gaze and for a given object proximity, i.e. for a point in object space on the corresponding light ray, an optical power Pui as the sum of the image proximity and the object proximity.

$$Pui = \mathrm{Prox}O + \mathrm{Prox}I$$

Using the same notations, we define in each direction of view and for a given object proximity, an astigmatism Ast as $$Ast = \left|\frac{1}{JT} - \frac{1}{JS}\right|$$

This definition corresponds to the astigmatism of the beam of light rays created by the lens. Note that the definition provides, in the primary direction of gaze, the classical value of astigmatism. The angle of the astigmatism commonly called axis is the angle γ. The angle γ is measured in the reference frame $\{Q', x_m, y_m, z_m\}$ linked to the eye. It corresponds to the angle at which the image S or T is formed depending on the convention used with respect to the direction $z_m$ in the plane $(Q', z_m, y_m)$.

This gives the possible definitions of the optical power and astigmatism of the lens in the wearing conditions, which can be calculated as explained in the article by B. Bourdoncle et al, "Ray tracing through progressive ophthalmic lenses," 1990 International Lens Design Conference, D T Moore ed., Proc. Soc. Photo. Opt. Instrum. Eng. Standard wearing conditions should be taken to mean the position of the lens with respect to the eye of an average wearer, defined in particular by a pantoscopic angle of −8°, a lens-eye distance of 12 mm, a curve of the spectacle frame of 0°. We could also use other conditions. Wearing parameters can be calculated using a ray tracing program, for a given lens. Optical power and astigmatism can also be calculated so that the prescription is satisfied at the reference point for far vision either for a wearer wearing his or her glasses under wearing conditions or as measured using a frontofocometer.

FIG. 3 is a perspective view in a configuration where the parameters α and β are nonzero. This highlights the effect of rotation of the eye by showing a fixed reference frame {x, y, z} and a reference frame $\{x_m, y_m, z_m\}$ linked to the eye. The reference frame {x, y, z} has its origin at the point Q'. The x-axis is the axis Q'O and is oriented from the lens towards the eye. The y-axis is vertical and orientated upwardly. The z-axis is such that the reference frame {x, y, z} is direct orthonormal. The reference frame $\{x_m, y_m, z_m\}$ is linked to the eye and is centered on the point Q'. Axis $x_m$ corresponds to the direction JQ' of gaze. Thus, for the primary direction of gaze, the two reference frames {x, y, z} and $\{x_m, y_m, z_m\}$ coincide. It is thus known that the properties of a finished lens can be characterized in several ways, notably as regards surface and optically. Surface characterization is thus equivalent to an optical characterization. In the case of a semi-finished lens, only a surface characterization can be used, given that optical characterization assumes that the lens was machined to the prescription of a wearer. On the contrary, in the case of an ophthalmic lens, the characterization can be either in terms of surface or optical, the two characterizations making it possible to describe the same object from two different perspectives.

Surface quantities are expressed relative to points. The points are located using an x-axis or a y-axis in a reference frame whose origin is usually the prism reference point $P_{PRP}$. The manufacturer of the lens is required to mark the prism reference point so that any optician can determine the values of prism for the lens. The prism measured at this point is then the resultant of prescribed prism and the prism used for machining. The prism reference point usually corresponds to the middle of micro-engravings on the lens. The manufacturer of the lens is also required to mark such micro-engravings in this situation.

Quantities in optics are expressed for directions of gaze. Directions of gaze are usually referenced in terms of lowering of gaze and azimuth in a reference frame whose origin is the center of rotation of the eye. When the lens is mounted in front of the eye, the fitting cross is placed in front of the pupil of the eye for a primary position of gaze. The term primary position of gaze should be taken to mean the situation where a wearer is looking straight ahead. In the selected reference frame, the fitting cross corresponds to an angle of lowering of gaze of 0° and an azimuth of 0°.

On the lenses of the Applicant, the direction of gaze passing through the fitting cross is situated 8° above the direction passing through the prism reference point, or, in the case of a surface characterization of the lens, 4 mm above the geometric center (0,0) of the lens. Other positions of the fitting cross however can be considered provided they correspond to the primary position of gaze previously defined. In addition, it will be observed that when the prism reference point is the midpoint of micro-engravings on the lens, knowledge of the micro-engravings makes it possible to simultaneously have a reference point both for prism and for the fitting cross.

We shall now study the surface making it possible to obtain greater comfort for the wearer in a section dealing with surface characterization. Then we will study how to express in optical terms the surface properties for a lens having this surface in a section dealing with optical characterization.

Surface Characterization

We shall consider a progressive multifocal ophthalmic lens comprising an aspherical surface having at every point thereon a value of mean sphere and a value of cylinder as defined above. The surface comprises a far vision region having a far vision reference point and a near vision region having a near vision reference point. The surface also includes a surface addition $\text{Add}_{SURF}$ defined as the difference in mean sphere between the reference point for near vision and the reference point for far vision, and an intermediate vision region located between the far vision region and the near vision region. The surface includes a main meridian of progression passing through the three regions and dividing the surface into a temporal region and a nasal region. A portion on the meridian passing through the far vision region defines a vertical axis. The lens also includes a fitting cross $C_M$ and a prism reference point $P_{PRP}$. The prism reference point $P_{PRP}$ defines with the vertical axis of the meridian and the horizontal axis linking the micro-engravings, a reference frame. This reference frame is used to define each of the points on the lens by a value on the y-axis relative to the vertical axis and a value on the x-axis relative to the horizontal axis. The prism reference point has a value of zero on the x-axis and a value of zero on the y-axis. As explained above, the lens can be a finished lens or a semi-finished lens blank.

The lens satisfies a first surface condition we call "surface condition 1". According to the "surface condition 1", the lens has a progression length less than 14.5 mm. The progression length is defined as the difference between the value on the y-axis of the fitting cross and the value on the y-axis of the point on the meridian where mean sphere variation with respect to the value of the mean sphere at the reference point for far vision is 85% of surface addition. This improves wearer comfort over a vertical eye-head strategy, the eye needing to move less in the vertical direction to obtain a correction appropriate for near vision. This effect is further increased if the lens satisfies a "surface condition 1a", that is to say, if the lens has a progression length less than 13.5 mm.

The lens surface satisfies a first condition called "surface condition 2" According to the "surface condition 2", the lens has a difference in ratio, denoted Dsurfacique2, between the value of cylinder and surface addition $\text{Add}_{SURF}$ less than 0.2 in absolute value for every pair of points of the lens symmetrical about the fitting cross $C_M$ and having the same value on the y-axis as the fitting cross $C_M$, the value on the x-axis of each point being less than 20 millimeters in absolute value. This ensures a certain symmetry of the distribution of cylinder at fitting cross level. This thus improves binocular vision for the wearer in far vision. Such a condition ensures optimum comfort for the wearer in far vision. Indeed, when the wearer gazes into the distance while slightly shifting the eyes horizontally, he or she will look through the nasal part of one lens with one eye, and through the temporal part of the other lens with the other eye. However, good binocular balance is obtained if the perceived qualities are much the same for each eye. This situation corresponds to optical aberrations being seen essentially identically for both eyes. Ensuring that values of cylinder, normalized to surface addition, are substantially symmetrical on both sides of the fitting cross, the left eye and right eye of the wearer encounter substantially the same optical defects. A good balance of perception between the eyes for far vision is assured since it is on the horizontal area at the fitting cross that the heaviest demands are made by a wearer gazing at a point in far vision while shifting the eyes laterally. This effect is further increased if the lens satisfies a "surface condition 2bis", that is to say, if the lens has a difference in ratio between the value of cylinder and surface addition of less than 0.1 in absolute value for every pair of points on the lens which are symmetrical with respect to the fitting cross $C_M$ located at the same y-axis value as the fitting cross $C_M$, the value on the x-axis of each point being limited to 20 millimeters in absolute value.

The lens also satisfies a combination of surface conditions we shall call 3 and 4 making it possible to limit aberrations at the periphery. Such a combination may be expressed in several ways, the surface satisfying such a combination being the same and having the same effect of improving the comfort of the wearer.

The lens can thus satisfy surface conditions we call 3A and 4A. We define a circle on the lens containing all points on the lens having the same value on the x-axis and value on the y-axis as points on a circle in the plane of the reference frame, 35 millimeters in diameter and centered on a point located 8.5 millimeters below the fitting cross and horizontally offset at the nasal side by 1.25 mm along, and a disc containing all the points on the lens having the same value on the x-axis and value on the y-axis as points in the within said circle. According to "surface condition 3A", the lens has a first ratio denoted Rsurfacique3A between maximum cylinder for all points in the circle on the one hand, and surface addition $\text{Add}_{SURF}$ on the other hand, less than 0.7. Furthermore, when the lens satisfies "surface condition 4A," it has a second ratio denoted Rsurfacique4A between firstly, maximum cylinder for all points on the disc and, secondly, surface addition $\text{Add}_{SURF}$ less than or equal to 1.05.

The combination of conditions 3A and 4A can broadly control aberrations of the lens over the set of points within the circle and more strictly control aberrations over a smaller set of points, specifically at the periphery of the circle. This consequently makes it possible to limit aberrations in peripheral vision. The wearer's peripheral vision and in particular dynamic vision is improved. Wearer comfort is thus improved. This effect is further increased if the lens also satisfies a "surface condition 3Abis", that is to say, if the lens has a first ratio Rsurfacique3A less than 0.65. Such an increase in effect is also found when the lens also satisfies a "surface condition 4Abis" that is to say if the lens has a second ratio Rsurfacique4A less than or equal to 0.75.

The lens now satisfies surface conditions denoted 1, 2, 3A and 4A. This combination makes it possible the lens to offer enhanced peripheral vision. The wearer's comfort is increased.

Alternatively, the lens can satisfy surface conditions denoted 3B and 4B. We define on the lens a disc containing all the points of the lens having the same value on the x-axis and the same value on the y-axis as points inside a circle in the plane of the reference frame of diameter 60 mm and centered on the prism reference point $P_{PRP}$. According to "surface condition 3B", the lens has a first ratio denoted Rsurfacique3B between the value of cylinder and surface addition of less than 0.7, for any point on the lens with a y-axis value of −20 mm, in other words 20 mm below the prism reference point in the reference frame defined above, and a value on the x-axis of less than 20 millimeters in absolute value. Furthermore, when the lens satisfies the "surface condition 4B", it has a second ratio denoted Rsurfacique4B between the value of the cylinder and surface addition less than or equal to 1.05, for any point on the disc. The combination of conditions 3B and 4B is used to broadly control aberrations of the lens on all points on the disc and more strictly control aberrations on a smaller set of points, in this case on a segment. The combination of conditions 3B and 4B can therefore limit aberrations in peripheral vision. The wearer's peripheral vision and in particular dynamic vision is improved. Wearer comfort is consequently improved. This effect is further increased if the lens also satisfies a "surface condition 3Bbis", that is to say, if the lens has a first ratio of less than 0.65. Such an increase in effect is also found when the lens also satisfies a "surface condition 4Bbis" that is to say if the lens has a second ratio less than or equal to 0.75.

The lens then satisfies surface conditions 1, 2, 3B and 4B. This combination makes it possible the lens to offer enhanced peripheral vision. The wearer's comfort is increased.

In a variant embodiment, the lens can also satisfy surface conditions we shall call 3C and/or 3D and 4C. We define on the lens a disc containing all the points of the lens having the same value on the x-axis and the same value on the y-axis as points inside a circle in the plane of the reference frame, 60 millimeters in diameter and centered on the prism reference point $P_{PRP}$. According to » surface condition 3C«, the lens has a first ratio denoted Rsurfacique3C between the value of cylinder and surface addition of less than 0.72, for every point of the lens in the temporal region with an value on the x-axis of 20 millimeters absolute value and the value of which on the y-axis is less than 20 millimeters in absolute value. The lens may alternatively or additionally to surface condition 3C, satisfy a "surface condition 3D". According to « surface condition 3D», the lens has a second ratio denoted Rsurfacique3D between the value of cylinder and surface addition of less than 0.72, for every point of the lens in the nasal region with a value on the x-axis of 22 mm in absolute value and the value on the y-axis is less than 20 millimeters in absolute value. Furthermore, when the lens satisfies the "surface condition 4C", it has a third ratio Rsurfacique4C between the value of cylinder and surface addition less than or equal to 0.95, for any point on the disc. The combination of conditions 3C and/or 3D and 4C can broadly control aberrations of the lens on the set of points within the disc and more strictly control aberrations at a more reduced set of points, in this case a vertical segment located on the temporal side and/or nasal side. This makes it possible to limit aberrations in peripheral vision. The wearer's peripheral vision and in particular dynamic vision is improved. Wearer comfort is thereby improved. This effect is further increased if the lens satisfies a "surface condition 3Cbis», that is to say, if the lens has a first ratio Rsurfacique3C less than 0.51. Such an effect is also increased if the lens satisfies « surface condition 3Dbis », that is to say, if the lens has also a second ratio Rsurfacique3D less than 0.55. Such an increase in effect is also found when the lens satisfies a « surface condition 4Cbis » or if the lens further exhibits a third ratio Rsurfacique4C less than or equal to 0.75.

The lens now satisfies surface conditions 1, 2, 3C and 4C. This combination makes it possible for the lens to offer enhanced peripheral vision. The wearer's comfort is increased.

As an illustration, three lenses numbered 1 to 3 can be considered. Lens 1 has an addition of 1.25 diopters, lens 2 an addition of 2.00 diopters and lens 3 an addition of 2.75 diopters. According to Examples 1 to 3, the complex surface satisfying surface conditions 1, 2, 3 and 4 is carried by the front face of the lens but it is understood that the complex surface may also be carried by the rear face of the lens.

FIGS. 4 to 6 show representations of the surface characteristics of the front surface of the lens 1. FIG. 4 shows mean isosphere lines for the front surface of the lens, the axes are graduated in mm; FIG. 5 shows isocylinder lines with the same axes. Isosphere lines are lines formed by the projection onto a plane tangent to the progressive surface at $P_{PRP}$ for points on the surface having a mean sphere of the same value. Similarly, we call isocylinder lines, lines formed by the projection on the above plane of points on the surface having a cylinder at the same value. FIG. 6 shows variation of sphere with respect to the reference point for far vision along the meridian, with the definition given above for sphere. The solid line shows the variation of mean sphere with respect to the reference point for far vision, and the dashed lines show variation in minimum sphere $(n-1)/R_1$ compared to the reference point for far vision and the variation in maximum sphere $(n-1)/R_2$ relative to the reference point for far vision.

The following are also shown in FIG. 5:
- a circle of diameter 35 mm and centered on a point located 8.5 millimeters below the fitting cross and offset horizontally at the nasal side by 1.25 millimeter;
- a segment comprising the points of the lens in the temporal region having a value of 20 mm on the x-axis in absolute value and whose value on the y-axis is less than 20 millimeters in absolute value;
- a segment comprising the points of the lens in the nasal region having an x-axis value of 22 mm in absolute value and whose value on the y-axis is less than 20 millimeters in absolute value.

FIGS. 7-9 are graphical representations of the surface characteristics of the front surface of the lens 2, using the same conventions as in FIGS. 4-6. FIG. 8 includes the same circles and segments as those shown in FIG. 5.

FIGS. 10 through 12 show graphic representations of the surface characteristics of the front surface of the lens 3, with the same conventions as in FIGS. 4-6. FIG. 11 includes the same circles and segments as those shown in FIGS. 5 and 8.

Table 1 shows the values of progression length for the three examples of lenses together with the values Dsurfacique2 of difference in ratio between cylinder and surface addition values in absolute value for every pair of points on the lens which are symmetrical with respect to the fitting cross and having the same y-axis value as the fitting cross and an x-axis value less than 20 millimeters in absolute value for the three examples of lenses.

TABLE 1

Value of progression length and of Dsurfacique2 for three examples of lenses.

| Example of Lens considered | Lens Type | Addition | Progression length (mm) | Dsurfacique2 |
|---|---|---|---|---|
| Example 1 | finished lens | 1.25 diopter | 13.48 | 0.040 |
| Example 2 | finished lens | 2.00 diopter | 13.48 | 0.045 |
| Example 3 | finished lens | 2.75 diopter | 13.52 | 0.058 |

For each of Examples 1 to 3, the progression length is less than 14.5 millimeters. Surface condition 1 is consequently well satisfied for the lenses of the examples considered. In addition, the lenses of Examples 1 and 2 show a progression length less than 13.5 millimeters; therefore they satisfy surface condition 1bis and provide improved comfort for the wearer when accessing near vision.

For each one of examples 1 to 3, the value Dsurfacique2 is less than 0.2. Surface condition 2 is consequently well satisfied by the lenses of the examples considered. Additionally, the lens is of examples 1, 2 and 3 have a value of Dsurfacique2 which is less than 0.1; they consequently also satisfy surface condition 2bis and provide the wearer with additional comfort.

Additionally, the values of first characteristic ratio Dsurfacique3A and second characteristic ratio Dsurfacique4A are given in table 2 for the three examples of lenses.

TABLE 2

Surface ratios Rsurfacique3A and Rsurfacique4A for three examples of lenses.

| Example of lens considered | Lens Type | Addition | Rsurfacique 3A | Rsurfacique 4A |
|---|---|---|---|---|
| Example 1 | Finished lens | 1.25 diopter | 0.65 | 0.72 |
| Example 2 | Finished lens | 2.00 diopter | 0.64 | 0.68 |
| Example 3 | Finished lens | 2.75 diopter | 0.67 | 0.74 |

For each of Examples 1 to 3, the ratio Rsurfacique3A is less than 0.7 (limiting to value on the circle). Surface condition 3A is consequently well satisfied by the lenses of the examples considered.

For each one of examples 1 to 3, the ratio Rsurfacique4A is less than 1.05 (limiting value inside the circle). Surface condition 4A is consequently well satisfied by the exemplary lenses considered.

The three examples of lenses considered consequently satisfy the combination of surface conditions 1, 2, 3A and 4A.

Additionally, the lens of example 2 has a ratio Rsurfacique3A less than 0.65. This means that the lens of example 2 satisfies surface condition 3Abis and has comfort still further improved compared to a lens the surface of which satisfies surface conditions 1, 2, 3A and 4A.

The lenses of examples 1, 2 and 3 additionally have a ratio Rsurfacique4A less than 0.75. This means that they also satisfy surface condition 4Abis and have comfort which is still further improved compared to a lens the surface of which satisfies surface conditions 1, 2, 3A and 4A.

The values of the first characteristic ratio Rsurfacique3B and of the second characteristic ratio Rsurfacique4B are also given in table 3 for the three examples of lenses.

TABLE 3

Surface ratios Rsurfacique3B and Rsurfacique4B for three examples of lenses

| Example of lens considered | Lens Type | Addition | Rsurfacique 3B | Rsurfacique 4B |
|---|---|---|---|---|
| Example 1 | Finished lens | 1.25 diopter | 0.59 | 0.72 |
| Example 2 | Finished lens | 2.00 diopter | 0.6 | 0.68 |
| Example 3 | Finished lens | 2.75 diopter | 0.6 | 0.74 |

For each of Examples 1 to 3, the ratio Rsurfacique3B is less than 0.7 (limiting value on the circle). Surface condition 3B is well satisfied by the lenses of the examples considered.

For each of Examples 1 to 3, the ratio Rsurfacique3B is less than 1.05 (limiting value within the circle). Surface condition 4B is consequently well satisfied by the lenses of the examples considered.

The three examples of lenses considered therefore satisfy the combination of surface conditions 1, 2, 3B and 4B.

In addition, the lenses of Examples 1, 2 and 3 have a ratio Rsurfacique3B less than 0.65. This means that the lenses of Examples 1, 2 and 3 satisfy surface condition 3Bbis and show further improved comfort compared to a lens whose surface satisfies surface conditions 1, 2, 3B and 4B.

The lenses of Examples 1, 2 and 3 also have a ratio Rsurfacique4B less than 0.75. This means that they also satisfy surface condition 4Bbis and exhibit further improved comfort compared to a lens whose surface satisfies surface conditions 1, 2, 3B and 4B.

The values for the first and second characteristic ratios Rsurfacique3C and Rsurfacique3D for surface conditions 3C and 3D and for the third characteristic ratio Rsurfacique4C for surface condition 4C are also given in Table 4 for the three examples of lenses.

TABLE 4

Surface ratios Rsurfacique3C, Rsurfacique3D and Rsurfacique4C for three examples of lenses

| Example of lens considered | Lens Type | Addition | Rsurfacique 3C | Rsurfacique 3D | Rsurfacique 4C |
|---|---|---|---|---|---|
| Example 1 | Finished lens | 1.25 diopter | 0.45 | 0.53 | 0.72 |
| Example 2 | Finished lens | 2.00 diopter | 0.5 | 0.52 | 0.68 |
| Example 3 | Finished lens | 2.75 diopter | 0.46 | 0.55 | 0.74 |

For each of Examples 1 to 3, the ratio Rsurfacique3C is less than 0.72. Surface condition 3C is indeed satisfied by the lenses of the examples considered.

For each of Examples 1 to 3, the ratio Rsurfacique3D is less than 0.72. Surface condition 3D is indeed satisfied by the lenses of the examples considered.

For each of Examples 1 to 3, the ratio Rsurfacique4C is less than 0.72. Surface condition 4C is therefore satisfied by the lenses of the examples considered.

The three examples of lenses considered therefore satisfy the combination of surface conditions 1, 2, 3C, 3D and 4C.

In addition, the lenses of Examples 1 to 3 have a ratio Rsurfacique3C less than 0.51. This means that the lenses of Examples 1 to 3 satisfy the surface condition 3Cbis and exhibit further improved comfort compared to a lens whose surface satisfies the surface conditions 1, 2, 3C, 3D and 4C.

The lenses of Examples 1 to 3 also have a ratio Rsurfacique3D less than 0.55. This means that the lenses of Examples 1 to 3 satisfy surface condition 3Dbis and exhibit further improved comfort compared to a lens whose surface satisfies the surface conditions 1, 2, 3C, 3D and 4C.

The lenses of Examples 1, 2 and 3 also have a ratio Rsurfacique4C less than 0.75. This means that they also satisfy surface condition 4Cbis and exhibit further improved comfort compared to a lens whose surface satisfies the surface conditions 1, 2, 3C, 3D and 4C.

Optical Characterization

We shall consider a progressive multifocal ophthalmic lens for a wearer for whom an addition has been prescribed. The lens has, for each direction of gaze, a power and a resultant astigmatism for standard wearing conditions, each direction of gaze corresponding to an angle $\alpha$ of lowering of gaze and an azimuth angle $\beta$ as defined above with reference to FIGS. 1 to 3. The lens has a fitting cross $C_M$ corresponding to a primary direction of gaze having an angle of lowering of gaze equal to zero and an azimuth angle of zero. The lens includes a far vision region having a far vision reference point for far vision corresponding to a reference direction of gaze for far vision, a near vision region comprising a reference point for near vision corresponding to a reference direction of gaze for near vision. The lens further comprises an intermediate vision region situated between the far vision region and the near vision region and a main meridian of progression passing through the to three regions and separating the lens into a temporal region and a nasal region.

The lens satisfies a first condition we call "optical condition 1". According to "optical condition 1", the lens has a progression length of less than 29°. Optical condition 1 is consequently the expression in optical terms of surface condition 1 which is expressed in surface terms. When considering progression length from an optical point of view, it is defined as the angular difference between the primary direction of gaze and the angle of lowering of gaze passing through the meridian and for which wearer optical power variation when compared to wearer optical power value at the reference point for far vision reaches 85% of the prescribed addition. Such a definition is the optical expression of the surface definition previously discussed in reference to surface condition 1. This makes it possible to improve wearer comfort when compared to the eye-head vertical strategy, the eye not having to move as much in the vertical direction in order to obtain the correction appropriate to his or her near vision. This effect is further increased if the lens satisfies an "optical condition 1bis", that is to say, if the lens has a progression length less than 27°.

The lens satisfies a second condition we call "optical condition 2". According to "optical condition 2", the lens has a difference in ratio, denoted Doptique2, between the value of resultant astigmatism and the prescribed addition of less than 0.3 in absolute value for ever pair of viewing directions symmetrical with respect to a primary viewing direction having an angle of lowering of gaze of zero and an azimuth angle less than 52° in absolute value. Resultant astigmatism should be taken to mean the difference between the prescribed astigmatism and astigmatism produced by the lens. Optical condition 2 is consequently an expression in optical terms of surface condition 2 which is expressed in terms of surface. This ensures a certain symmetry of the distribution of the resultant astigmatism for directions of gaze having the same degree of lowering of gaze than the direction of gaze passing through the fitting cross. This makes it possible to improve binocular vision for the wearer in far vision. Such a condition thus makes it possible to ensure optimum comfort to the wearer in far vision. Indeed, when the wearer looks into the distance slightly shifting the eyes horizontally, he or she will look through the nasal part of one lens with one eye and through the temporal part of the other lens with the other eye. However, good binocular balance is achieved if perceived qualities are much the same for each eye. This situation corresponds to optical aberrations being seen essentially identically for both eyes. By ensuring that resultant astigmatism values normalized to the prescribed addition are substantially symmetrical at both sides of the fitting cross, the left eye and right eye of the wearer encounter substantially the same optical defects. A good balance of perception between both eyes for far vision is thus assured because the wearer makes the heaviest demands on the horizontal region at the fitting cross when gazing at a distance point while shifting the eyes laterally. This effect is further improved if the lens satisfies an "optical condition 2bis", that is to say if the lens has a difference in ratio between value of resultant astigmatism and prescribed addition of less than 0.08 in absolute value for every pair of viewing directions symmetrical with respect to the primary viewing direction and having an angle of lowering of gaze of zero and an azimuth angle less than 52° in absolute value.

The lens also satisfies a combination of optical conditions 3 and 4 which limits aberrations at the periphery. Such optical conditions can be expressed in different ways, the surface(s) satisfying such conditions being the same with the same effect of improving the comfort of the wearer.

The lens can also satisfy optical conditions we shall call 3A and 4A. When we say that a lens satisfies "optical condition 3A" we mean that a lens has a first ratio, denoted Roptique3A, between, firstly, the value of resultant astigmatism for all viewing directions passing through an angular circle 70° in diameter centered on a viewing direction of 17° lowering of gaze below the fitting cross and an azimuth of 2.5° to the nasal side and, secondly, a prescribed addition of less than 0.88. Optical condition 3A is an expression in optical terms of surface condition 3A which is expressed in terms of surface. Furthermore, when the lens satisfies "optical condition 4A", it has a second ratio, denoted Roptique4A, between the value of resultant astigmatism for all viewing directions passing inside said angular circle and prescribed addition less than or equal to 1. Optical condition 4A is consequently an expression in optical terms of surface condition 4A which is expressed in terms of surface.

The combination of conditions 3A and 4A makes it possible to broadly control aberrations of the lens for all viewing directions passing inside the angular circle and more strictly control aberrations for a smaller set of viewing direction, in this case the directions of gaze through the periphery of the angular circle. This makes it possible to limit aberrations in peripheral vision. The wearer's peripheral vision and in particular dynamic vision is improved. Wearer comfort is consequently improved. This effect is further increased if the lens also satisfies an "optical condition 3Abis", that is to say, if the lens has a first ratio Roptique3A less than 0.8. Optical condition 3Abis is an expression in optical terms of surface condition 3Abis which is expressed in terms of surface. Such an increase of the effect is also found when the lens also satisfies an "optical condition 4Abis" that is to say if the lens has a second ratio Roptique4A less than or equal to 0.9. Optical condition 4Abis is an expression in optical terms of surface condition 4Abis which is expressed in terms of surface.

The lens then satisfies optical conditions 1, 2, 3A and 4A. This combination makes it possible for the lens to offer enhanced peripheral vision. The wearer's comfort is increased.

Alternatively, the lens can satisfy conditions denoted optical conditions 3B and 4B. When we say that the lens satisfies "optical condition 3B" we mean that the lens has a first ratio, denoted Roptique3B, between the value of resultant astigmatism and prescribed addition of less than 0.75, for every viewing direction having an angle of lowering of gaze of 44° below the fitting cross, azimuth being less than 26° in absolute value. Optical condition 3B is an expression in optical terms of surface condition 3B which is expressed in terms of surface. Furthermore, when the lens satisfies "optical condition 4B", it has a second ratio, denoted Roptique4B, between value of resultant astigmatism and prescribed addition less than or equal to 1.1, for every direction of gaze passing inside an angular disc of diameter 100° centered on the primary viewing direction. Viewing directions which pass through this disc have an angle of lowering of gaze and an azimuth angle such that $\sqrt{\alpha^2+\beta^2} \leq 100°$.

Optical condition 4B is an expression in optical terms of surface condition 4B which is expressed in terms of surface. The combination of conditions 3B and 4B makes it possible to broadly control aberrations of the lens for all directions passing inside the disc and more strictly control aberrations on a smaller set of directions, in this case directions passing through a segment. The combination of conditions 3B and 4B can therefore limit aberrations in peripheral vision. The wearer's peripheral vision and in particular dynamic vision is improved. Wearer comfort is consequently improved. This effect is further increased if the lens also satisfies an "optical condition 3Bbis", that is to say, if the lens has a first ratio Roptique3B less than 0.6. Optical condition 3Bbis is an expression in optical terms of surface condition 3Bbis which is expressed in terms of surface. Such an increase of effect is also found when the lens also satisfies an "optical condition 4Bbis" that is to say if the lens exhibits a second ratio Roptique4B. Optical condition 4Bbis is an expression in optical terms of surface condition 4Bbis which is expressed in terms of surface.

The lens thus satisfies optical conditions 1, 2, 3B and 4B. This combination makes it possible for the lens to offer enhanced peripheral vision. The wearer's comfort is increased.

In a variant embodiment, the lens can also satisfy optical conditions 3C and/or 3D and 4C. When we say that a lens satisfies "optical condition 3C" this means that a lens has a first ratio, denoted Roptique3C, between the value of resultant astigmatism and the prescribed addition of less than 0.9, for every viewing direction passing through the temporal region having an azimuth of 40° and an angle of lowering of gaze less than 32° in absolute value. Optical condition 3C is an expression in optical terms of surface condition 3C which is expressed in terms of surface. The lens may alternatively or in addition to satisfying optical condition 3C, satisfy an optical condition 3D. When we say that a lens satisfies "optical condition 3D" we mean that the lens has a second ratio, denoted Roptique3D, between resultant astigmatism and addition less than 0.85, for every direction of gaze passing through the nasal region and having an azimuth of 38° and an angle of lowering of gaze less than 32° in absolute value. Optical condition 3D is an expression in optical terms of surface condition 3D which is expressed in terms of surface. Furthermore, when the lens satisfies "optical condition 4C", it has a third ratio, denoted Roptique4C, between the value of resultant astigmatism and the prescribed addition less than or equal to 1.2, for every direction of gaze through an angular disc of 100° diameter centered on the primary direction of gaze. Directions of gaze passing through this disc have an angle of lowering of gaze and an azimuth angle such that $\sqrt{\alpha^2+\beta^2} \leq 100°$.

Optical condition 4C is an expression in optical terms of surface condition 4C which is expressed in terms of surface. The combination of conditions 3C and/or 3D and 4C can broadly control aberrations of the lens for all directions of gaze passing inside the disc and more strictly control aberrations for a smaller set of directions, namely directions passing through a vertical segment located on the temporal side or nasal side. This makes it possible to limit aberrations in peripheral vision. The wearer's peripheral vision and in particular dynamic vision is improved. Wearer comfort is consequently improved. This effect is further increased if the lens satisfies an "optical condition 3Cbis", that is to say, if the lens has a first ratio Roptique3C less than 0.65. Optical condition 3Cbis is the expression in optical terms of surface condition 3Cbis which is expressed in terms of surface. This effect is further increased if the lens satisfies an "optical condition 3Dbis", that is to say, if the lens has also a second ratio Roptique3D less than 0.8. Optical condition 3Dbis is the expression in optical terms of surface condition 3Dbis which is expressed in terms of surface. Such an increase of the effect is also found when the lens satisfies an "optical condition 4Cbis" if the lens has also a third ratio Roptique4C less than or equal to 0.85. Optical condition 4Cbis is the expression in optical terms of surface condition 4Cbis which is expressed in terms of surface.

The lens thus satisfies optical conditions 1, 2, 3C and 4C. This combination makes it possible for the lens to offer enhanced peripheral vision. The wearer's comfort is increased.

As an illustration, the lenses 4, 5 and 6. Lens 4 has an addition of 1.25 diopters, lens 5 an addition of 2.00 diopters and lens 6 and addition of 2.75 diopters. These values correspond to the additions prescribed. According to the examples 4, 5 and 6, the complex surface is shared between the two faces but it is understood that the complex surface can be introduced only on the front face of the lens or the rear face of the lens.

The optical characteristics presented below in FIGS. 13-15 were obtained by calculation. FIGS. 13 through 15 show graphic representations of the optical characteristics of the lens 4. FIG. 13 is a graphical representation of lines of equal power, i.e. corresponding to viewing directions with the same power value. The x and y axes show respectively the angles $\beta$ and $\alpha$ as defined above. FIG. 13 also makes it possible to observe a map of a defect in power. FIG. 14 shows, with the same axes, lines of equal resultant astigmatism. FIG. 14 is consequently a graphical representation of resultant astigmatism. FIG. 15 shows power along the meridian, with the definition of power given above. Values on the x-axis are graduated in diopters, and values on the y-axis give the lowering of the viewing direction, the solid line shows power, and the dashed lines the quantities 1/JT and 1/JS defined in FIG. 2, for object distances corresponding to an ergorama representative of the distances of object points in each direction of gaze and simulating a mean object space. FIG. 15 consequently gives access to power and resultant astigmatism defect along the meridian.

On FIG. 14 the following are also shown
- a circle of diameter 70° centered on a direction of gaze having an angle of lowering of gaze of 17° below the fitting cross and having an azimuth angle of 2.5°;
- a segment grouping together points on the lens in the temporal region having an azimuth angle of 40° and an angle of lowering of gaze less than 32° in absolute value;
- a segment grouping together points on the lens in the nasal region having an azimuth angle of 38° in absolute value and an angle of lowering of gaze of less than 32° in absolute value.

FIGS. 16 to 18 show graphic representations of the optical characteristics of the lens 5, with the same conventions as in FIGS. 13 to 15. FIG. 17 includes the same circles and segments as those shown in FIG. 14. FIGS. 19-21 show graphic representations of the optical characteristics of the lens 6, with the same conventions as in FIGS. 13 to 15. FIG. 20 includes the same circles and segments as shown in FIGS. 14 and 17.

Table 5 gives the values of progression lengths for three examples of lenses as well as maximum Doptique2 values for difference in ratio between the value of resultant astigmatism and prescribed addition in absolute value for every pair of viewing directions which are symmetrical relative to the primary viewing direction and having zero angle of lowering of gaze and an azimuth angle less than 52° in absolute value for each of the three examples of lenses.

TABLE 5

Value for progression length and of value of Doptique2 for three examples of lenses.

| Example of lens considered | Lens Type | Addition | Progression length (°) | Doptique2 |
|---|---|---|---|---|
| Example 4 | finished lens | 1.25 diopter | 26.3 | 0.059 |
| Example 5 | finished lens | 2.00 diopter | 25.8 | 0.066 |
| Example 6 | finished lens | 2.75 diopter | 25.7 | 0.085 |

For each of Examples 4 to 6, the progression length is less than 29°. Optical condition 1 is consequently well satisfied by the lenses of the examples considered.

In addition, the lenses of Examples 4 to 6 have a progression length less than 27°, so they satisfy optical condition 1bis and bring the wearer greater comfort for accessing near vision.

For each one of examples 4 to 6, maximum value Doptique2 is less than 0.3. Surface condition 2 is consequently well satisfied by the lenses of the examples considered. Additionally, the lenses of the examples also satisfy condition Doptique2bis with a maximum value less than 0.08.

Furthermore, the values of the characteristic ratios denoted Roptique3A for optical condition 3A and denoted Roptique4A for optical condition 4A are given in Table 6 for the examples of lenses 4, 5 and 6.

TABLE 6

Ratios Roptique3A and Roptique4A for three examples of lenses.

| Example of lens considered | Addition | Roptique3A | Roptique4A |
|---|---|---|---|
| Example 4 | 1.25 diopter | 0.8 | 0.86 |
| Example 5 | 2.00 diopter | 0.78 | 0.82 |
| Example 6 | 2.75 diopter | 0.839 | 0.88 |

For each of examples 4, 5 and 6, the ratio Roptique3A is less than 0.88 (limiting value on the circle). Optical condition 3A is consequently well satisfied by the lenses of the examples considered.

For each one of examples 4, 5 and 6, the ratio Roptique4A is less than 1 (limiting value inside the circle). Optical condition 4A is consequently well satisfied by the lenses of the examples considered.

The three examples of lenses considered consequently satisfy the combination of surface conditions 1, 2, 3A and 4A.

Additionally, the lens of example 5 has a ratio Roptique3A less than 0.8. This means that the lens of example 5 satisfies optical condition 3Abis and has still further improved comfort compared to a lens the surface of which satisfies optical conditions 1, 2, 3A and 4A.

The lenses of example 4, 5 and 6 additionally have a ratio Roptique4A less than 0.9. This means that they satisfy optical condition 4Abis and have still further improved comfort compared to a lens the surface of which satisfies optical conditions 1, 2, 3A and 4A.

The values for characteristic ratio Roptique3B for optical condition 3B and characteristic ratio Roptique4B for optical condition 4B are also given in table 7, for examples of lenses 4, 5 and the 6.

TABLE 7

Ratios Roptique3B and Roptique4B for three examples of lens.

| Example of lens considered | Types of lens | Addition | Roptique3B | Roptique4B |
|---|---|---|---|---|
| Example 4 | Finished lens | 1.25 diopter | 0.554 | 0.86 |
| Example 5 | Finished lens | 2.00 diopter | 0.5 | 0.82 |
| Example 6 | Finished lens | 2.75 diopter | 0.567 | 0.88 |

For each of Examples 4, 5 and 6, the ratio Roptique3B is less than 0.75. Optical condition 3B is thus well satisfied in the lenses of the examples considered.

For each one of examples 4, 5 and the 6, Roptique4B is less than 1.1. Optical condition 4B is consequently well satisfied by the lenses of the examples considered.

The three examples of lenses considered consequently satisfy the combination of surface conditions 1, 2, 3B and 4B.

Additionally, the lenses of examples 4, 5 and the 6 have a ratio Roptique3B less than 0.6. This means that the lenses of examples 4, 5 and 6 satisfy optical condition 3Bbis and have comfort which is still further improved when compared to a lens the surface of which satisfies optical conditions 1, 2, 3B and 4B.

The lenses of examples 4, 5 and 6 additionally have a ratio Roptique4B less than 0.9. This means that they satisfy optical condition 4Bbis and have comfort still further improved compared to a lens the surface of which satisfies optical conditions 1, 2, 3B and 4B.

The values of the first characteristic ratio Roptique3C for optical condition 3C, on the second characteristic ratio Roptique3D for optical condition 4C and third optical condition Roptique4C are also given in table 8 for examples of lenses 4, 5 and 6.

TABLE 8

Ratios Roptique3C, Roptique3D and Roptique4C for three examples of lenses.

| Example of lens considered | Types of lens | Addition | Roptique3C | Roptique3D | Roptique4C |
|---|---|---|---|---|---|
| Example 4 | Finished lens | 1.25 diopter | 0.58 | 0.79 | 0.86 |
| Example 5 | Finished lens | 2.00 diopter | 0.63 | 0.77 | 0.82 |
| Example 6 | Finished lens | 2.75 diopter | 0.598 | 0.824 | 0.88 |

For each one of examples 4, 5 and 6, the ratio Roptique3C is less than 0.9. Optical condition 3C is consequently well satisfied by the lenses of the examples considered.

For each one of examples 4, 5 and 6, the ratio Roptique3D is less than 0.85. Optical condition 3D is consequently well satisfied by the lenses of the examples considered.

For each one of examples 4, 5 and 6, the ratio Roptique4C is less than 1.2. Optical condition 4C is consequently well satisfied by the lenses of the examples considered.

The three examples of lenses considered consequently satisfy the combination of surface conditions 1, 2, 3C, 3D and 4C.

Moreover, the lenses of example 4, 5 and 6 have a ratio Roptique3C less than 0.65. This means that the lenses of examples 4, 5 and 6 satisfy optical condition 3Cbis and have still further improved comfort compared to a lens the surface of which satisfies optical conditions 1, 2, 3C, 3D and 4C.

Additionally, the lenses of examples 4, 5 and 6 have a ratio Roptique3D less than 0.8. This means that the lenses of examples 4, 5 and 6 satisfy optical condition 3Dbis and have still further improved comfort compared to a lens the surface of which satisfies optical conditions 1, 2, 3C, 3D and 4C.

The lenses of examples 4, 5 and 6 have a ratio Roptique4C less than 0.85. This means that the lenses of examples 4, 5 and 6 satisfy optical condition 4Cbis and have still further improved comfort compared to a lens the surface of which satisfies optical conditions 1, 2, 3C, 3D and 4C.

The combination of the various conditions described above is not satisfied by any of the multifocal ophthalmic lenses of the prior art tested by the applicant. This applies both to optical characterization and to surface characterization.

As regards surface characterization, the combinations discussed above make it possible to define a surface carried by a semi-finished lens. In the case of a finished lens, the combinations of characteristics expressed in optical or in surface terms make it possible to improve comfort of the wearer wearing the lens.

Regardless of whether the lenses are finished or semi-finished, they can be part of visual equipment for improving wearer comfort of the visual equipment.

Additionally, the lenses disclosed above can be determined using determination procedures. They can be implemented in the framework of an ophthalmic lens optimization procedure intended for a wearer of known prescription. This optimization procedure can be the one disclosed in European patent EP 0,990,939 or EP 1,920,291. Thus, as will be known by the person skilled in the art, the surface of progressive lenses is obtained using digital optimization with the aid of a computer, by setting conditions on the limits for a certain number of lens parameters. One or more of the criteria defined above can be employed as limiting conditions.

The invention claimed is:

1. A complex surface of a progressive multifocal ophthalmic lens having at every point thereon a value of mean sphere and a cylinder value, the surface comprising:
    a far vision region having a reference point for far vision;
    a near vision region having a reference point for near vision;
    a surface addition defined as a difference in mean sphere between the reference point for near vision and the reference point for far vision;
    an intermediate vision region between the far vision region and the near vision region;
    a main meridian of progression passing through the three regions and dividing the surface into a nasal region and a temporal region, a portion on the meridian passing through the far vision region defining a vertical axis;
    a fitting cross;
        a prism reference point in the center of a segment connecting micro-engravings, the prism reference point defining, with the vertical axis of the meridian and a horizontal axis connecting the micro-engravings, a reference frame, the reference frame making it possible to define each of the points on the lens by a value on a y-axis relative to the vertical axis and a value on an x-axis relative to the horizontal axis, the prism reference point having a value of zero on the x-axis and on the y-axis;
    a circle grouping together all points on the lens having the same value on the x-axis and the same value on the y-axis as points situated within a second circle in a plane of the reference frame of 35 mm diameter and centered on a point located 8.5 mm below the fitting cross and offset horizontally to a nasal side by 1.25 mm;
    a disc grouping together all points on the lens having the same value on the x-axis and the same value on the y-axis as points situated within the grouping circle;
        a progression length less than 14.5 mm, the progression length being defined as a difference between a value on the y-axis of the fitting cross and a value on the y-axis of the point on the meridian where variation in mean sphere with respect to the value of mean sphere at the reference point for far vision reaches 85% of surface addition;
    a difference in ratio between cylinder value and surface addition less than 0.2 in absolute value for every pair of points on the lens symmetrical with respect to the fitting cross and having the same y-axis value as the fitting cross and an x-axis value less than 20 millimeters in absolute value;
    a first ratio between a maximum cylinder value or all of the points in the, grouping circle and a surface addition being less than 0.7; and
    a second ratio between a maximum cylinder value for all the points on the disc and a surface addition being less than or equal to 1.05.

2. The surface according to claim 1, wherein the first ratio is less than 0.65.

3. The surface according to claim 1, wherein the second ratio is less than or equal to 0.75.

4. The surface according to claim 1, wherein the difference in ratio between the cylinder value and the surface addition is less than 0.1 in absolute value for every pair of points on the lens which are symmetrical with respect to the fitting cross and having the same y-axis value as a fitting cross and the x-axis value less than 20 mm in absolute value.

5. The surface according to claim 1, wherein the progression length is less than 13.5 mm.

6. The surface according to claim 1, wherein the lens is a finished or semi-finished lens.

7. An item of visual equipment including at least one lens according to claim 1.

8. A progressive multifocal ophthalmic lens for a wearer for whom an addition has been prescribed, the lens comprising:
    for each direction of gaze, a power and a resultant astigmatism for standard wearing conditions, each direction of gaze corresponding to an angle of lowering of gaze and an azimuth angle;
    a far vision region having a reference point for far vision corresponding to a reference direction of gaze for far vision;
    a near vision region having a reference point for near vision corresponding to a reference direction of gaze for near vision;
    an intermediate vision region between the far vision region and the near vision region;
    a main meridian of progression passing through the three regions and dividing the lens into a temporal region and a nasal region;
    a fitting cross corresponding to a primary direction of gaze having an angle of lowering of gaze equal to zero and an azimuth angle of zero;
    a progression length less than 29°, the progression length being defined as a difference in angle between a primary direction of gaze and an angle of lowering of gaze passing through the meridian for which wearer optical power variation with respect to wearer optical power value at the reference point for far vision reaches 85% of the prescribed addition;

a difference in ratio between resultant astigmatism value and prescribed addition less than 0.3 in absolute value and for every pair of directions of gaze that are symmetrical with respect to the primary direction of gaze, and having zero angle of lowering of gaze and an azimuth angle less than 52° in absolute value;

a first ratio between a value of resultant astigmatism for all the directions of gaze passing through an angular circle of diameter 70° centred on a direction of gaze having an angle of lowering of gaze of 17° below the fitting cross and having an azimuth angle of 2.5° in absolute value at a nasal side and a surface addition being less than 0.88; and a second ratio between a value of resultant astigmatism for all the directions of gaze passing inside the circle and a prescribed addition being less than or equal to 1.

9. The lens according to claim 8, wherein the first ratio is less than 0.8.

10. The lens according to claim 8, wherein the second ratio is less than or equal to 0.9.

11. The lens according to claim 8, wherein the difference in ratio between the value of resultant astigmatism and the prescribed addition is less than 0.08 in absolute value for every pair of directions of gaze that are symmetrical with respect to the primary direction of gaze and having zero angle of lowering of gaze and the azimuth angle less than 52° in absolute value.

12. The lens according to claim 8, wherein the progression length is less than 27°.

* * * * *